US012711643B2

(12) United States Patent
Kutaragi

(10) Patent No.: US 12,711,643 B2
(45) Date of Patent: Aug. 18, 2026

(54) TARGET DIGITAL TWIN MODEL GENERATION SYSTEM, CONTROL SYSTEM FOR ROBOT, VIRTUAL SHOP GENERATION SYSTEM, TARGET DIGITAL TWIN MODEL GENERATION METHOD, CONTROL METHOD FOR ROBOT, AND VIRTUAL SHOP GENERATION METHOD

(71) Applicant: Ascent Robotics Inc., Tokyo (JP)

(72) Inventor: Ken Kutaragi, Tokyo (JP)

(73) Assignee: Ascent Robotics Inc., Tokyo (JP)

(*) Notice: Subject to any disclaimer, the term of this patent is extended or adjusted under 35 U.S.C. 154(b) by 153 days.

(21) Appl. No.: 18/703,062

(22) PCT Filed: Oct. 18, 2022

(86) PCT No.: PCT/JP2022/038717
§ 371 (c)(1),
(2) Date: Apr. 19, 2024

(87) PCT Pub. No.: WO2023/068252
PCT Pub. Date: Apr. 27, 2023

(65) Prior Publication Data

US 2024/0420355 A1 Dec. 19, 2024

(30) Foreign Application Priority Data

Oct. 21, 2021 (JP) ................................. 2021-172085

(51) Int. Cl.
*G06T 7/586* (2017.01)
*B25J 9/16* (2006.01)
(Continued)

(52) U.S. Cl.
CPC ............. *G06T 7/586* (2017.01); *B25J 9/1697* (2013.01); *G06Q 30/0641* (2013.01); *G06T 7/40* (2013.01);
(Continued)

(58) Field of Classification Search
CPC ...... G06T 7/586; G06T 15/04; G06Q 30/0641
See application file for complete search history.

(56) References Cited

U.S. PATENT DOCUMENTS 9,019,268 B1 4/2015 Kuffner, Jr. et al.
9,669,543 B1 6/2017 Stubbs et al.
(Continued)

FOREIGN PATENT DOCUMENTS

JP 2019-086294 A 6/2019
JP 2019-530062 A 10/2019
(Continued)

OTHER PUBLICATIONS

Extended European Search Report in European Appln. No. 22883556.7, mailed on Aug. 29, 2025, 10 pages.
(Continued)

*Primary Examiner* — Matthew Salvucci
(74) *Attorney, Agent, or Firm* — Fish & Richardson P.C.

(57) ABSTRACT

A system outputs planar light having a predetermined pattern and light having a plurality of wavelengths, individually captures images of the target irradiated with the planar light and the target sequentially irradiated with the light having the plurality of wavelengths at a plurality of imaging positions corresponding to the plurality of illumination positions in synchronization with timings at which the light is output, controls a light output and an imager, acquires three-dimensional data indicating a three-dimensional shape over an entire circumference of a surface of the target on the basis of an imaging result of the target irradiated with the planar light, acquires two-dimensional data indicating two-dimensional appearance over the entire circumference of the target viewed from the plurality of imaging positions, and generates a target digital twin model that reproduces the appearance of the target in a computer-readable form by associat-
(Continued)

ing the three-dimensional data with the two-dimensional data.

5 Claims, 14 Drawing Sheets

(51) Int. Cl.

| | |
|---|---|
| ***G06Q 30/0601*** | (2023.01) |
| ***G06T 7/40*** | (2017.01) |
| ***G06T 7/521*** | (2017.01) |
| ***G06T 7/579*** | (2017.01) |
| ***G06T 15/04*** | (2011.01) |
| ***G06T 17/00*** | (2006.01) |

(52) U.S. Cl.
CPC .............. *G06T 7/521* (2017.01); *G06T 7/579* (2017.01); *G06T 15/04* (2013.01); *G06T 17/00* (2013.01); *G06T 2207/10024* (2013.01); *G06T 2207/10028* (2013.01); *G06T 2207/10048* (2013.01); *G06T 2207/10152* (2013.01)

(56) References Cited

U.S. PATENT DOCUMENTS

| | | | | |
|---|---|---|---|---|
| 10,958,895 | B1 | 3/2021 | Gorumkonda | |
| 2016/0150213 | A1 | 5/2016 | Mutti | |
| 2018/0046649 | A1 | 2/2018 | Dal Mutto et al. | |
| 2018/0341271 | A1 | 11/2018 | Blayas | |
| 2019/0130589 | A1 | 5/2019 | Fu et al. | |
| 2019/0236096 | A1 | 8/2019 | Dal Mutto et al. | |
| 2020/0372626 | A1* | 11/2020 | Dal Mutto .............. | G06T 17/00 |
| 2021/0186659 | A1 | 6/2021 | Li et al. | |
| 2021/0321872 | A1* | 10/2021 | Saphier .................. | A61B 5/004 |

FOREIGN PATENT DOCUMENTS

| | | | |
|---|---|---|---|
| WO | 2021/199467 | A1 | 10/2021 |
| WO | WO 2023/068252 | A1 | 4/2023 |

OTHER PUBLICATIONS

International Search Report and Written Opinion in International Appln. No. PCT/JP2022/038717, mailed on Jan. 10, 2023, 16 pages (English Translation).

* cited by examiner

810(130)
GENERATOR
B811 3D SENSING
B812 3D POINT CLOUD
B813 3D POLYGON MESH
B814 INTEGRATE
800 TARGET
B815 2D RGB SENSING
B816 2D RGB IMAGE
B817 2D TEXTURE
B818 2D RENDERING IMAGE

820(130)
DISCRIMINATOR
B821 COMPARE
B823 SPECIFY REGION TO BE CORRECTED

Figure 11:
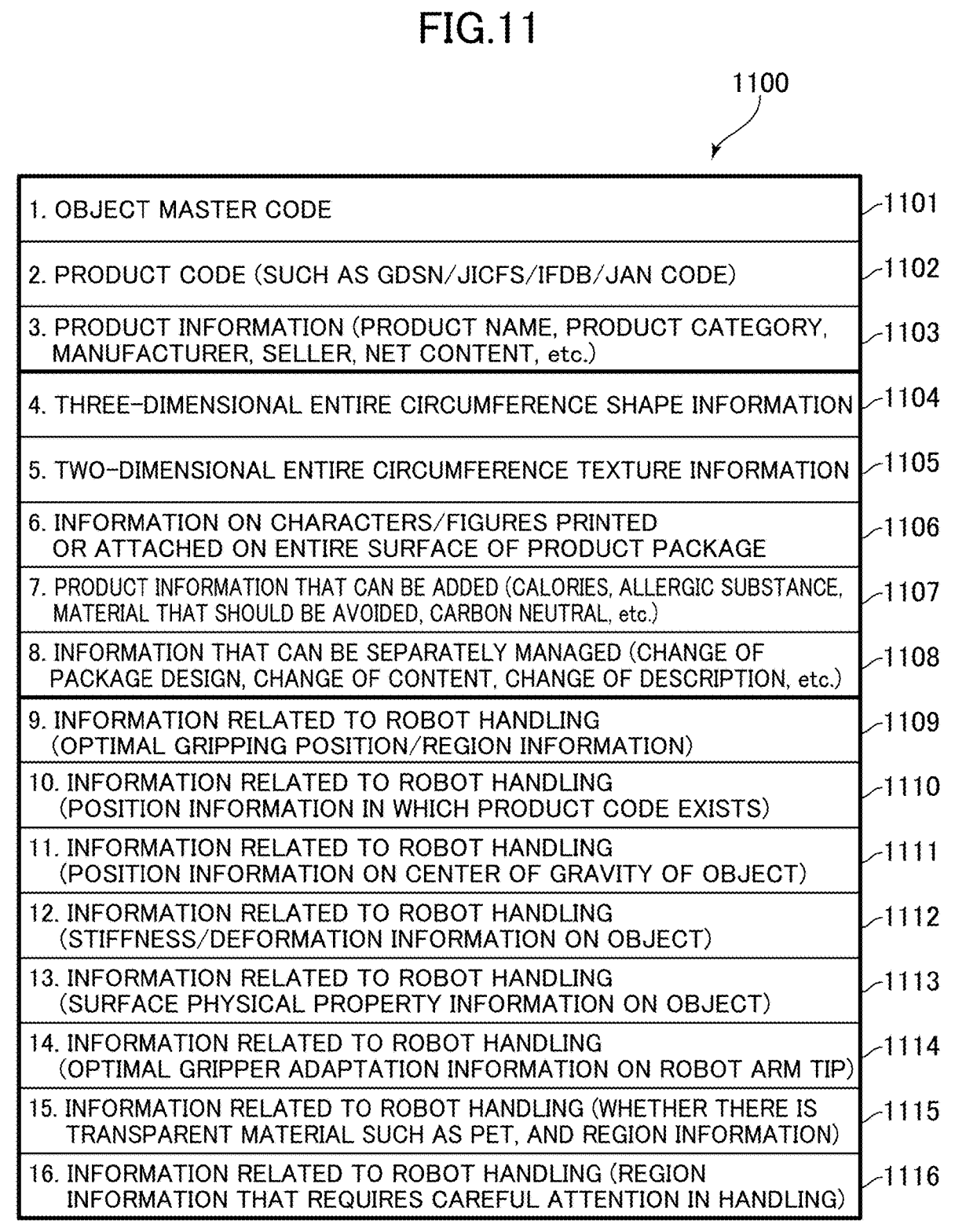

| | |
|---|---|
| 1. OBJECT MASTER CODE | 1101 |
| 2. PRODUCT CODE (SUCH AS GDSN/JICFS/IFDB/JAN CODE) | 1102 |
| 3. PRODUCT INFORMATION (PRODUCT NAME, PRODUCT CATEGORY, MANUFACTURER, SELLER, NET CONTENT, etc.) | 1103 |
| 4. THREE-DIMENSIONAL ENTIRE CIRCUMFERENCE SHAPE INFORMATION | 1104 |
| 5. TWO-DIMENSIONAL ENTIRE CIRCUMFERENCE TEXTURE INFORMATION | 1105 |
| 6. INFORMATION ON CHARACTERS/FIGURES PRINTED OR ATTACHED ON ENTIRE SURFACE OF PRODUCT PACKAGE | 1106 |
| 7. PRODUCT INFORMATION THAT CAN BE ADDED (CALORIES, ALLERGIC SUBSTANCE, MATERIAL THAT SHOULD BE AVOIDED, CARBON NEUTRAL, etc.) | 1107 |
| 8. INFORMATION THAT CAN BE SEPARATELY MANAGED (CHANGE OF PACKAGE DESIGN, CHANGE OF CONTENT, CHANGE OF DESCRIPTION, etc.) | 1108 |
| 9. INFORMATION RELATED TO ROBOT HANDLING (OPTIMAL GRIPPING POSITION/REGION INFORMATION) | 1109 |
| 10. INFORMATION RELATED TO ROBOT HANDLING (POSITION INFORMATION IN WHICH PRODUCT CODE EXISTS) | 1110 |
| 11. INFORMATION RELATED TO ROBOT HANDLING (POSITION INFORMATION ON CENTER OF GRAVITY OF OBJECT) | 1111 |
| 12. INFORMATION RELATED TO ROBOT HANDLING (STIFFNESS/DEFORMATION INFORMATION ON OBJECT) | 1112 |
| 13. INFORMATION RELATED TO ROBOT HANDLING (SURFACE PHYSICAL PROPERTY INFORMATION ON OBJECT) | 1113 |
| 14. INFORMATION RELATED TO ROBOT HANDLING (OPTIMAL GRIPPER ADAPTATION INFORMATION ON ROBOT ARM TIP) | 1114 |
| 15. INFORMATION RELATED TO ROBOT HANDLING (WHETHER THERE IS TRANSPARENT MATERIAL SUCH AS PET, AND REGION INFORMATION) | 1115 |
| 16. INFORMATION RELATED TO ROBOT HANDLING (REGION INFORMATION THAT REQUIRES CAREFUL ATTENTION IN HANDLING) | 1116 |

TARGET DIGITAL TWIN MODEL GENERATION SYSTEM, CONTROL SYSTEM FOR ROBOT, VIRTUAL SHOP GENERATION SYSTEM, TARGET DIGITAL TWIN MODEL GENERATION METHOD, CONTROL METHOD FOR ROBOT, AND VIRTUAL SHOP GENERATION METHOD

CROSS-REFERENCE TO RELATED APPLICATIONS

This application is a national phase entry under 35 U.S.C. 371 of PCT Application Serial No. PCT/JP2022/038717, filed Oct. 18, 2022, which claims the benefit of the priority date of Japan Patent Application No. 2021-172085, filed Oct. 21, 2021. The contents of the prior applications are incorporated by reference in their entirety into this application.

TECHNICAL FIELD

The present disclosure relates to a target digital twin model generation system, a control system for a robot, a virtual shop generation system, a target digital twin model generation method, a control method for a robot, and a virtual shop generation method.

BACKGROUND ART

Conventionally, there is a known technique that acquires information indicating a three-dimensional shape like uneven shape on a surface of a target by capturing an image of the target on which planar light having a predetermined pattern called a structured light pattern or the like is projected.

CITATION LIST

Patent Literature

Patent Literature 1

Japanese Patent Laid-Open No. 2019-86294

SUMMARY OF INVENTION

Technical Problem

However, information regarding appearance of a target is not limited only to information indicating a three-dimensional shape as described above. For example, a surface of the target may include two-dimensional information such as colors, characters or figures. It is therefore desired to exhaustively acquire information regarding the appearance of the target by acquiring information indicating a three-dimensional shape and two-dimensional information together.

Thus, in order to solve one of problems, the present disclosure provides a target digital twin model generation system and a target digital twin model generation method, which are capable of exhaustively acquiring information regarding appearance of a target, as well as a robot control system, a robot control method, a virtual shop generation system, and a virtual shop generation method, which utilize the above system and method.

Solution to Problem

A target digital twin model generation system as one example of the present disclosure includes: a light output that outputs planar light having a predetermined pattern and light having a plurality of wavelengths, including visible light and invisible light to a target from a plurality of illumination positions that surround the target at different timings; an imager that individually captures images of the target irradiated with the planar light and the target sequentially irradiated with the light having the plurality of wavelengths at a plurality of imaging positions corresponding to the plurality of illumination positions in synchronization with timings at which the planar light and the light having the plurality of wavelengths are respectively output; and a controller that controls the light output and the imager, the controller acquiring three-dimensional data indicating a three-dimensional shape over an entire circumference of a surface of the target on the basis of an imaging result of the target irradiated with the planar light, acquiring two-dimensional data indicating two-dimensional appearance over the entire circumference of the target viewed from the plurality of imaging positions on the basis of imaging results of the target sequentially irradiated with the light having the plurality of wavelengths, and generating a target digital twin model that reproduces appearance of the target in a computer-readable form by associating the three-dimensional data with the two-dimensional data.

In the target digital twin model generation system described above, the controller acquires texture data indicating texture of the surface of the target as the two-dimensional data on the basis of an imaging result of the target irradiated with the visible light and acquires optical absorption property data in which an optical absorption region on the surface of the target is visualized as the two-dimensional data on the basis of an imaging result of the target irradiated with the invisible light.

Further, in the target digital twin model generation system described above, the controller corrects the three-dimensional data so that a difference discriminated by a discriminator becomes smaller on the basis of a generator that generates a first appearance image indicating appearance of the target at a certain viewpoint from a model generated by pasting the texture data to the three-dimensional data, and the discriminator that discriminates the difference between the first appearance image generated by the generator and a second appearance image which is generated from the imaging result of the target irradiated with the visible light and which indicates appearance of the target at the same viewpoint as the viewpoint of the first appearance image, and generates the target digital twin model by associating the corrected three-dimensional data with the two-dimensional data.

Further, in the target digital twin model generation system described above, the controller recognizes additional information added to the surface of the target as characters of figures on the basis of the two-dimensional appearance of the target acquired from the target digital twin model and generates target master data as a comprehensive database regarding the target in which the additional information is registered along with the three-dimensional data and the two-dimensional data.

Further, in the target digital twin model generation system described above, the controller acquires a product code and product information associated with the target on the basis of the additional information and further registers the acquired product code and product information in the target master data.

Further, in the target digital twin model generation system described above, the controller learns handling information for implementing optimal handling of the target including an optimal gripping position of the target by performing a simulation of handling of the target by a robot and further registers the learned handling information in the target master data.

A robot control system as another example of the present disclosure includes: a sensor that detects information regarding appearance of a handling target of a robot; and a robot controller that controls the robot so as to perform handling of the handling target on the basis of a detection result of the information regarding the appearance of the handling target and the handling information of the target master data acquired from the above-described target digital twin model generation system.

In the robot control system described above, the robot controller acquires a product code added to the handling target from the detection result of the information regarding the appearance of the handling target, and in a case where the acquired product code is different from the product code registered in the target master data, controls the robot so as to perform handling of another handling target.

Further, in the robot control system described above, in a case where the product code acquired from the detection result of the information regarding the appearance of the handling target matches the product code registered in the target master data, the robot controller acquires product information added to a surface of the handling target from the detection result of the information regarding the appearance of the handling target, and in a case where the acquired product information is different from the product information registered in the target master data, updates the target master data on the basis of the acquired product information.

A virtual shop generation system as still another example of the present disclosure includes: an acquirer that acquires the target master data from the above-described target digital twin model generation system; and a virtual shop generator that generates a virtual shop that virtually reproduces a store in which products associated with product codes and product information registered in the target master data acquired by the acquirer are arbitrarily displayed.

A target digital twin model generation method as yet another example of the present disclosure includes: outputting planar light having a predetermined pattern and light having a plurality of wavelengths, including visible light and invisible light to a target from a plurality of illumination positions that surround the target at different timings; individually capturing images of the target irradiated with the planar light and the target sequentially irradiated with the light having the plurality of wavelengths at a plurality of imaging positions corresponding to the plurality of illumination positions in synchronization with timings at which the planar light and the light having the plurality of wavelengths are respectively output; and controlling the outputting and the capturing images, acquiring three-dimensional data indicating a three-dimensional shape over an entire circumference of a surface of the target on the basis of an imaging result of the target irradiated with the planar light, acquiring two-dimensional data indicating two-dimensional appearance over the entire circumference of the target viewed from the plurality of imaging positions on the basis of imaging results of the target sequentially irradiated with the light having the plurality of wavelengths, and generating a target digital twin model that reproduces appearance of the target in a computer-readable form by associating the three-dimensional data with the two-dimensional data.

The target digital twin model generation method described above includes: acquiring texture data indicating texture of the surface of the target as the two-dimensional data on the basis of an imaging result of the target irradiated with the visible light; and acquiring optical absorption property data in which an optical absorption region on the surface of the target is visualized as the two-dimensional data on the basis of an imaging result of the target irradiated with the invisible light.

Further, the target digital twin model generation method described above includes: correcting the three-dimensional data so that a difference discriminated by a discriminator becomes smaller on the basis of a generator that generates a first appearance image indicating appearance of the target at a certain viewpoint from a model generated by pasting the texture data to the three-dimensional data, and the discriminator that discriminates the difference between the first appearance image generated by the generator and a second appearance image which is generated from the imaging result of the target irradiated with the visible light and which indicates appearance of the target at the same viewpoint as the viewpoint of the first appearance image; and generating the target digital twin model by associating the corrected three-dimensional data with the two-dimensional data.

Further, the target digital twin model generation method described above includes: recognizing additional information added to the surface of the target as characters or figures on the basis of the two-dimensional appearance of the target acquired from the target digital twin model; and generating target master data as a comprehensive database regarding the target in which the additional information is registered along with the three-dimensional data and the two-dimensional data.

Further, the target digital twin model generation method described above includes: acquiring a product code and product information associated with the target on the basis of the additional information; and further registering the acquired product code and product information in the target master data.

Further, the target digital twin model generation method described above includes: learning handling information for implementing optimal handling of the target including an optimal gripping position of the target by performing a simulation of handling of the target by a robot; and further registering the learned handling information in the target master data.

A robot control method as still another example of the present disclosure includes: detecting information regarding appearance of a handling target of a robot; and controlling the robot so as to perform handling of the handling target on the basis of a detection result of the information regarding the appearance of the handling target and the handling information of the target master data acquired using the above-described target digital twin model generation method.

The robot control method described above includes: acquiring a product code added to the handling target from the detection result of the information regarding the appearance of the handling target; and in a case where the acquired product code is different from the product code registered in the target master data, controlling the robot so as to perform handling of another handling target.

Further, the robot control method described above includes: in a case where the product code acquired from the detection result of the information regarding the appearance of the handling target matches the product code registered in the target master data, acquiring product information added to a surface of the handling target from the detection result of the information regarding the appearance of the handling target; and in a case where the acquired product information is different from product information registered in the target master data, updating the target master data on the basis of the acquired product information.

A virtual shop generation method as yet another example of the present disclosure includes: acquiring target master data using the above-described target digital twin model generation method; and generating a virtual shop that virtually reproduces a store in which products associated with product codes and product information registered in the acquired target master data are arbitrarily displayed.

BRIEF DESCRIPTION OF DRAWINGS

FIG. 11 is an exemplary schematic view for explaining target master data according to the embodiment.

DESCRIPTION OF EMBODIMENT

An embodiment of a system and a method according to the present disclosure will be described below on the basis of the drawings. A configuration of the embodiment described below, and operation and effects provided by the configuration are merely one example, and the configuration and the operation and effects are not limited to those described below.

Further, while in the present disclosure, ordinal numbers such as "first" and "second" are used as necessary, these ordinal numbers are used for convenience of identification and do not indicate specific priorities.

Figure 1:
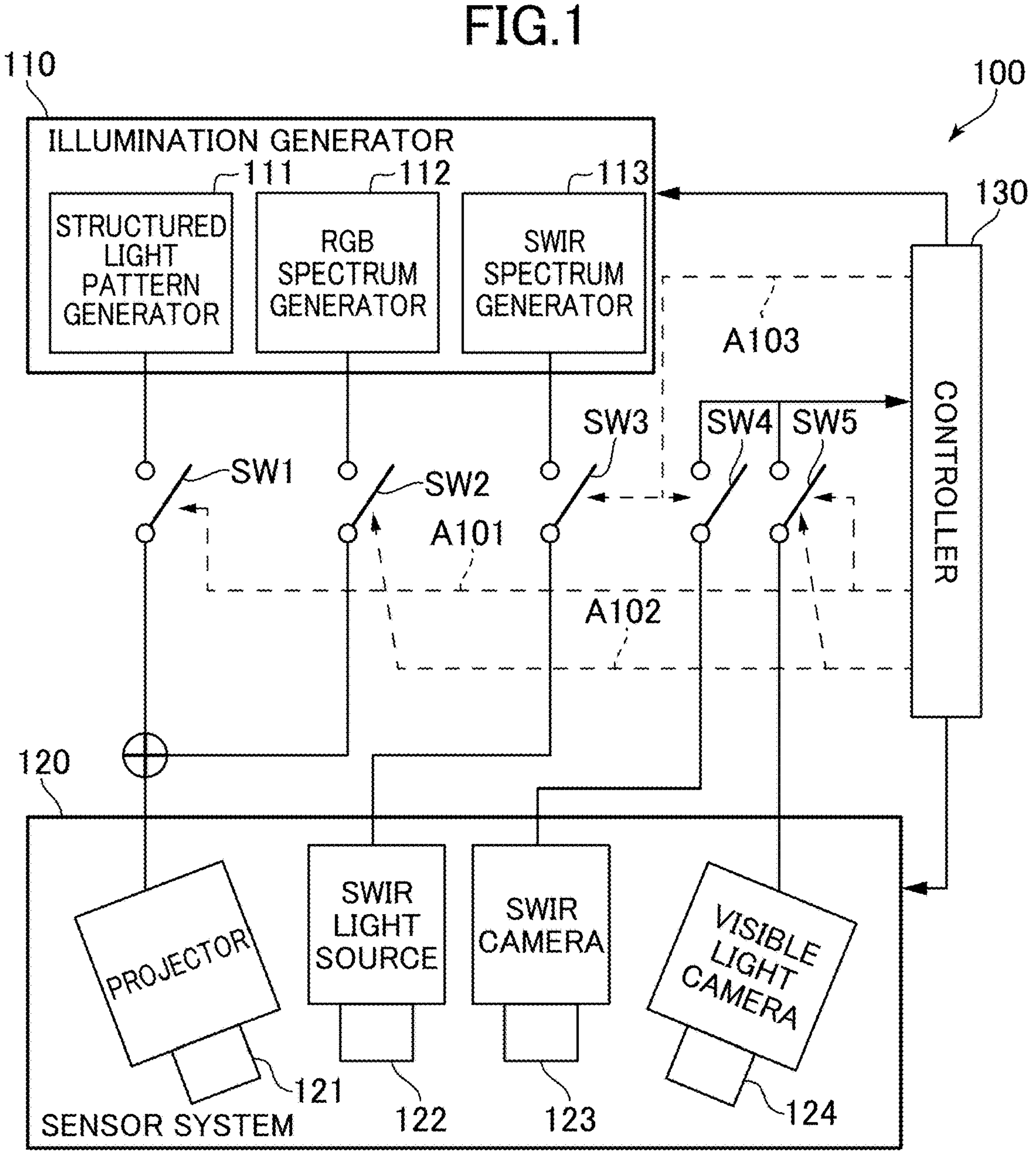
FIG. 1 is an exemplary schematic block diagram illustrating a configuration of a target digital twin model generation system according to an embodiment.

FIG. 1 is an exemplary schematic block diagram illustrating a configuration of a target digital twin model generation system 100 according to the embodiment. As will be described below, the target digital twin model generation system 100 according to the embodiment is configured to generate a target digital twin model that reproduces all of appearance of a target in a computer-readable form by acquiring and integrating information indicating a three-dimensional shape of a surface of the target and two-dimensional information such as colors, characters or figures attached on the surface of the target.

As illustrated in FIG. 1, the target digital twin model generation system 100 includes an illumination generator 110, a sensor system 120, a controller 130, and a plurality of switches SW1 to SW5. Further, the illumination generator 110 includes a structured light pattern generator 111, an RGB spectrum generator 112, and an SWIR spectrum generator 113, and the sensor system 120 includes a projector 121, an SWIR light source 122, an SWIR camera 123, and a visible light camera 124. Note that the projector 121 and the SWIR light source 122 are one example of a "light output" of the present disclosure, and the SWIR camera 123 and the visible light camera 124 are one example of an "imager" of the present disclosure.

The structured light pattern generator 111 generates a predetermined pattern of planar light, which is called a structured light pattern, or the like, such as a gray code. Further, the RGB spectrum generator 112 generates a wavelength spectrum of visible light, more specifically, a wavelength spectrum of light corresponding to R (red), a wavelength spectrum of light corresponding to G (green) and a wavelength spectrum of light corresponding to B (blue). Further, the SWIR spectrum generator 113 generates a wavelength spectrum of invisible light, more specifically, a wavelength spectrum of light corresponding to short wavelength infrared (SWIR).

The projector 121 is connected to the structured light pattern generator 111 via the switch SW1 and is also connected to the RGB spectrum generator 112 via the switch SW2. By this means, in a case where the switch SW1 is ON, and the switch SW2 is OFF, the projector 121 outputs planar light having the predetermined pattern generated by the structured light pattern generator 111, and in a case where the switch SW2 is ON, and the switch SW1 is OFF, outputs visible light having the wavelength spectrum generated by the RGB spectrum generator 112. Further, the SWIR light source 122 is connected to the SWIR spectrum generator 113 via the switch SW3. By this means, in a case where the switch SW3 is ON, the SWIR light source 122 outputs invisible light having the wavelength spectrum generated by the SWIR spectrum generator 113.

The SWIR camera 123 includes an image sensor that captures invisible light and captures an image of the target irradiated with the SWIR light output from the SWIR light source 122. The SWIR camera 123 is connected to the controller 130 via the switch SW4. By this means, the SWIR camera 123 outputs image data indicating the target irradiated with the SWIR light to the controller 130 in a case where the switch SW4 is ON. Further, the visible light camera 124 includes an image sensor that captures visible light and captures an image of the target irradiated with the planar light having the predetermined pattern or the RGB light output from the projector 121. The visible light camera 124 is connected to the controller 130 via the switch SW5. By this means, the visible light camera 124 outputs image data indicating the target irradiated with the planar light having the predetermined pattern or image data indicating the target irradiated with the RGB light to the controller 130 in a case where the switch SW5 is ON.

Note that while in the example illustrated in FIG. 1, the projector 121 that outputs visible light and the SWIR light source 122 that outputs invisible light are separately provided, in the embodiment, a single light output capable of outputting both visible light and invisible light may be used in place of a combination of the projector 121 and the SWIR light source 122. Further, while in the example illustrated in FIG. 1, the SWIR camera 123 that captures invisible light and the visible light camera 124 that captures visible light are separately provided, in the embodiment, a single imager capable of capturing both visible light and invisible light may be used in place of a combination of the SWIR camera 123 and the visible light camera 124.

The controller 130 includes a control circuit such as a processor, and controls the illumination generator 110, the sensor system 120, and the switches SW1 to SW5. For example, the controller 130 acquires image data indicating the target irradiated with the planar light having the predetermined pattern from the visible light camera 124 by setting the switches SW1 and SW5 to ON (while setting other switches to OFF) as indicated with a dashed arrow A101. In a similar manner, the controller 130 acquires image data indicating the target irradiated with the RGB light from the visible light camera 124 by setting the switches SW2 and SW5 to ON (while setting other switches to OFF) as indicated with a dashed arrow A102. Further, the controller 130 acquires image data indicating the target irradiated with the SWIR light from the SWIR camera 123 by setting the switches SW3 and SW4 to ON (while setting other switches to OFF) as indicated with a dashed arrow A103.

More specifically, the controller 130 acquires three types of image data to generate the target digital twin model by executing timing control as indicated in the following FIG. 2.

Figure 2:
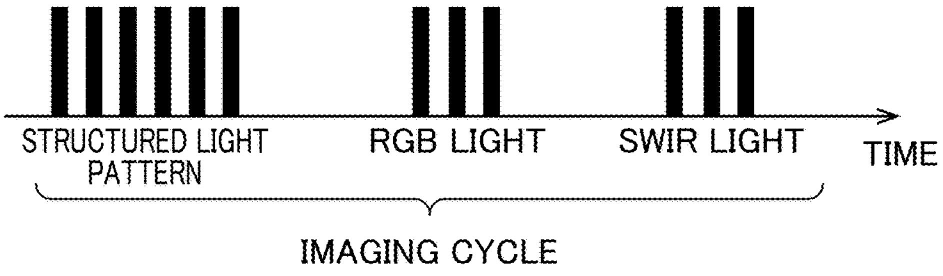
FIG. 2 is an exemplary schematic view illustrating one example of timing control to be executed by a controller according to the embodiment.

FIG. 2 is an exemplary schematic view illustrating one example of timing control to be executed by the controller 130 according to the embodiment.

As illustrated in FIG. 2, the controller 130 performs three types of imaging in one imaging cycle and acquires three types of image data. First, as the first type of imaging, the controller 130 synchronizes the projector 121 (and the structured light pattern generator 111) with the visible light camera 124 on the basis of a plurality of times of burst signals and acquires image data on the target continuously irradiated with the structured light pattern. Then, as the second type of imaging, the controller 130 synchronizes the projector 121 (and the RGB spectrum generator 112) with the visible light camera 124, acquires image data on the target irradiated with the RGB light a plurality of times while changing, for example, an exposure period, and acquires image data of high dynamic range (HDR) by synthesizing the acquired image data. Then, as the third type of imaging, the controller 130 synchronizes the SWIR light source 122 (and the SWIR spectrum generator 113) with the SWIR camera 123 and acquires image data on the target irradiated with the SWIR light a plurality of times while changing, for example, a wavelength of the SWIR light.

Note that the timing control illustrated in FIG. 2 is merely one example. In the embodiment, if the image data on the target irradiated with the planar light having the predetermined pattern (structured light pattern), the image data on the target irradiated with the visible light (RGB light), and the image data on the target irradiated with the invisible light (SWIR light) can be appropriately acquired, the number of times of imaging, an imaging scheme, imaging order, and the like, need not necessarily be as illustrated in FIG. 2.

, in order to generate the target digital twin model that exhaustively reproduces appearance of the target, acquisition of the above-described three types of image data at a certain viewpoint is not sufficient. Thus, in the embodiment, the above-described three types of image data are sequentially acquired at a plurality of viewpoints that surround the target in a form as illustrated in the following FIG. 3.

Figure 3:
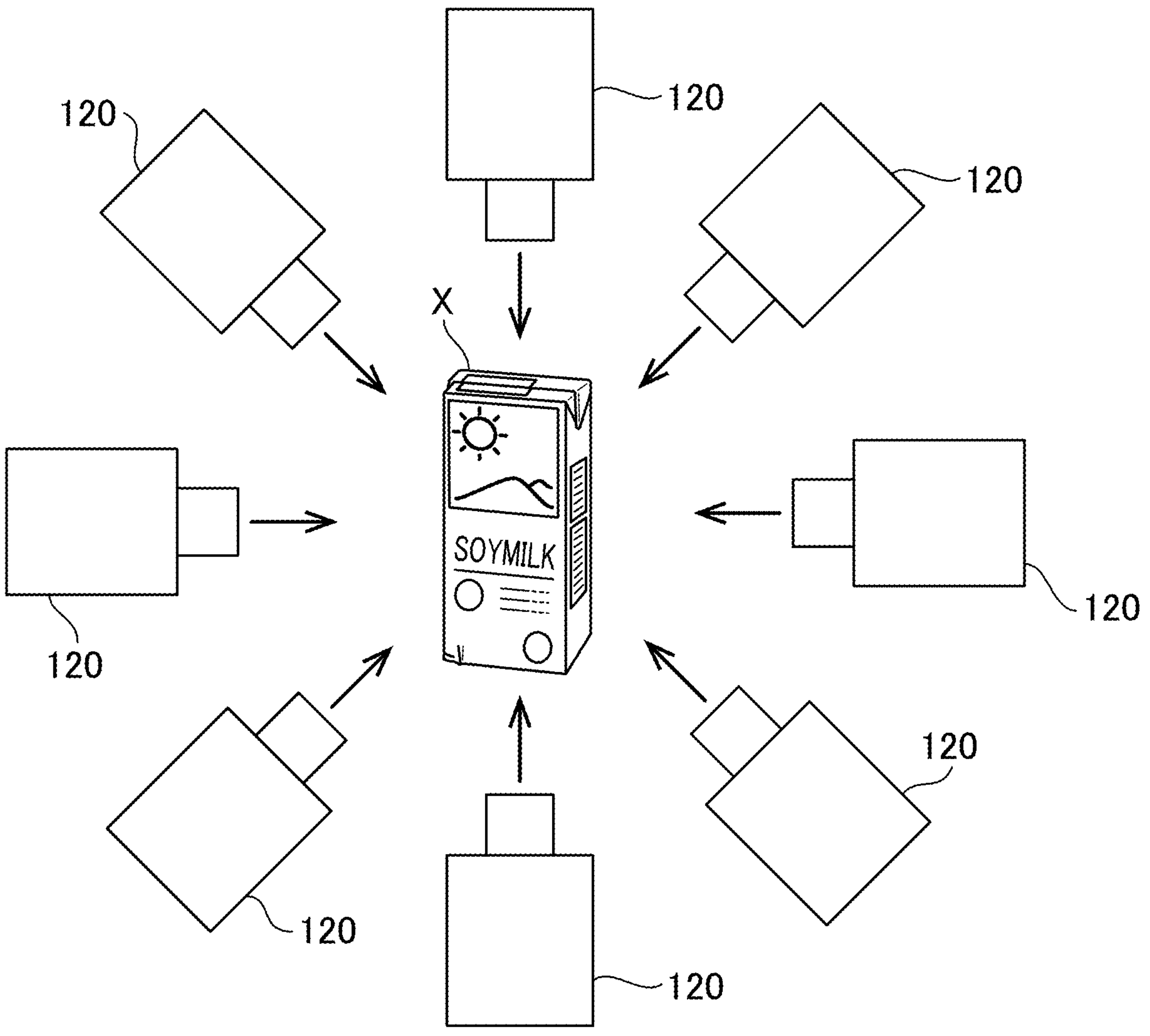
FIG. 3 is an exemplary schematic view illustrating imaging of a target according to the embodiment.

FIG. 3 is an exemplary schematic view illustrating imaging of the target according to the embodiment.

As illustrated in FIG. 3, the sensor system 120 acquires the above-described three types of image data at a plurality of viewpoints that surround an article (object) X, for example, by (three-dimensionally) moving over an entire circumference of the target article X in accordance with driving of an actuator (not illustrated) under the control of the controller 130.

Here, among the above-described three types of image data, the image data on the target irradiated with the structured light pattern can be utilized to acquire three-dimensional data indicating a three-dimensional shape of a surface of the target, for example, point cloud data as illustrated in the following FIG. 4.

Figure 4:
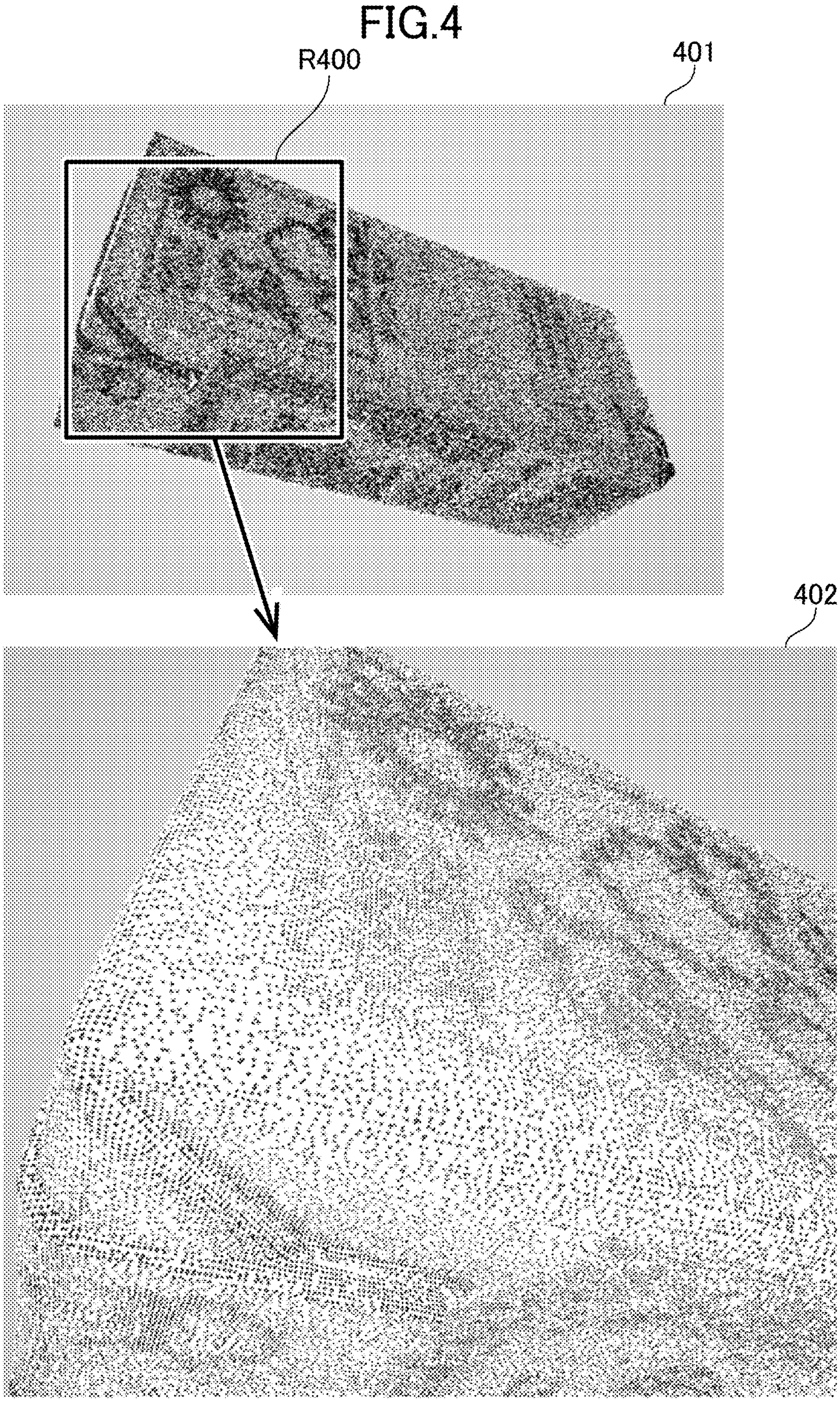
FIG. 4 is an exemplary schematic view for explaining point cloud data according to the embodiment.

FIG. 4 is an exemplary schematic view for explaining the point cloud data according to the embodiment.

In the example illustrated in FIG. 4, an image 401 shows one example of point cloud data corresponding to the article X illustrated in FIG. 3, and an image 402 shows an enlarged view of a partial region R400 of the image 401. The point cloud data is data representing distribution of uneven shape on a surface of the article X. By meshing the point cloud data, polygon mesh data formed with a plurality of fine planes can be acquired. This polygon mesh data can also be three-dimensional data indicating a three-dimensional shape of the surface of the target.

Further, among the above-described three types of image data, the image data on the target irradiated with the RGB light can be utilized to acquire two-dimensional data indicating two-dimensional appearance of the surface of the target, for example, texture data as illustrated in the following FIG. 5.

Figure 5:
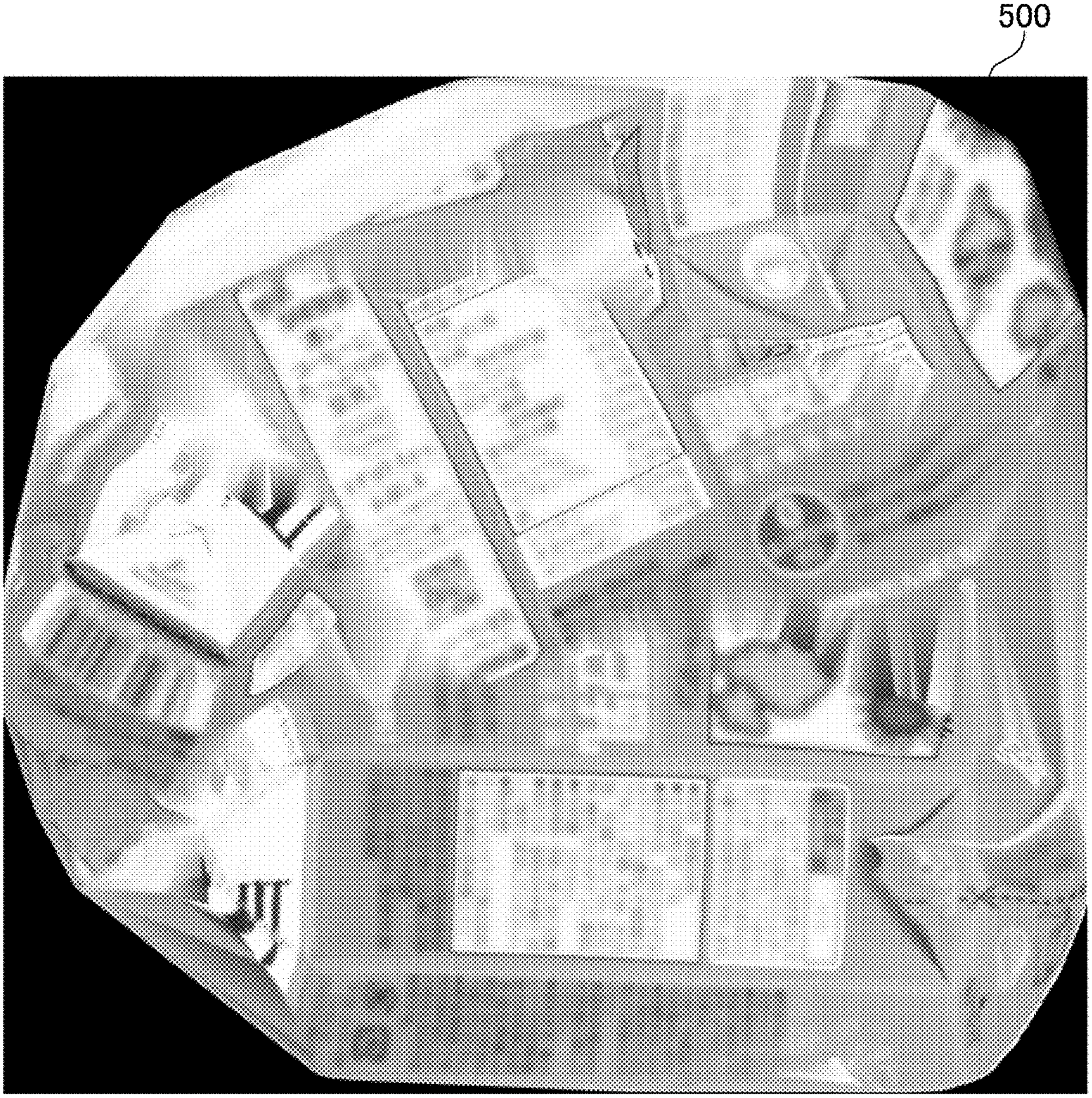
FIG. 5 is an exemplary schematic view for explaining texture data according to the embodiment.

FIG. 5 is an exemplary schematic view for explaining the texture data according to the embodiment.

In the example illustrated in FIG. 5, an image 500 shows the texture data corresponding to the article X illustrated in FIG. 3. The texture data is data representing colors, characters, figures, and the like, attached on the surface of the article X.

Here, when the texture data is pasted to the polygon mesh data after positions are aligned, it can be expected to reproduce appearance of the target. However, in a case where the target includes a material with high transparency in a visible light region, for example, a plastic material such as a polyethylene terephthalate (PET) material, the appearance of the target cannot be successfully acquired in some cases only through imaging with visible light.

Figure 6:
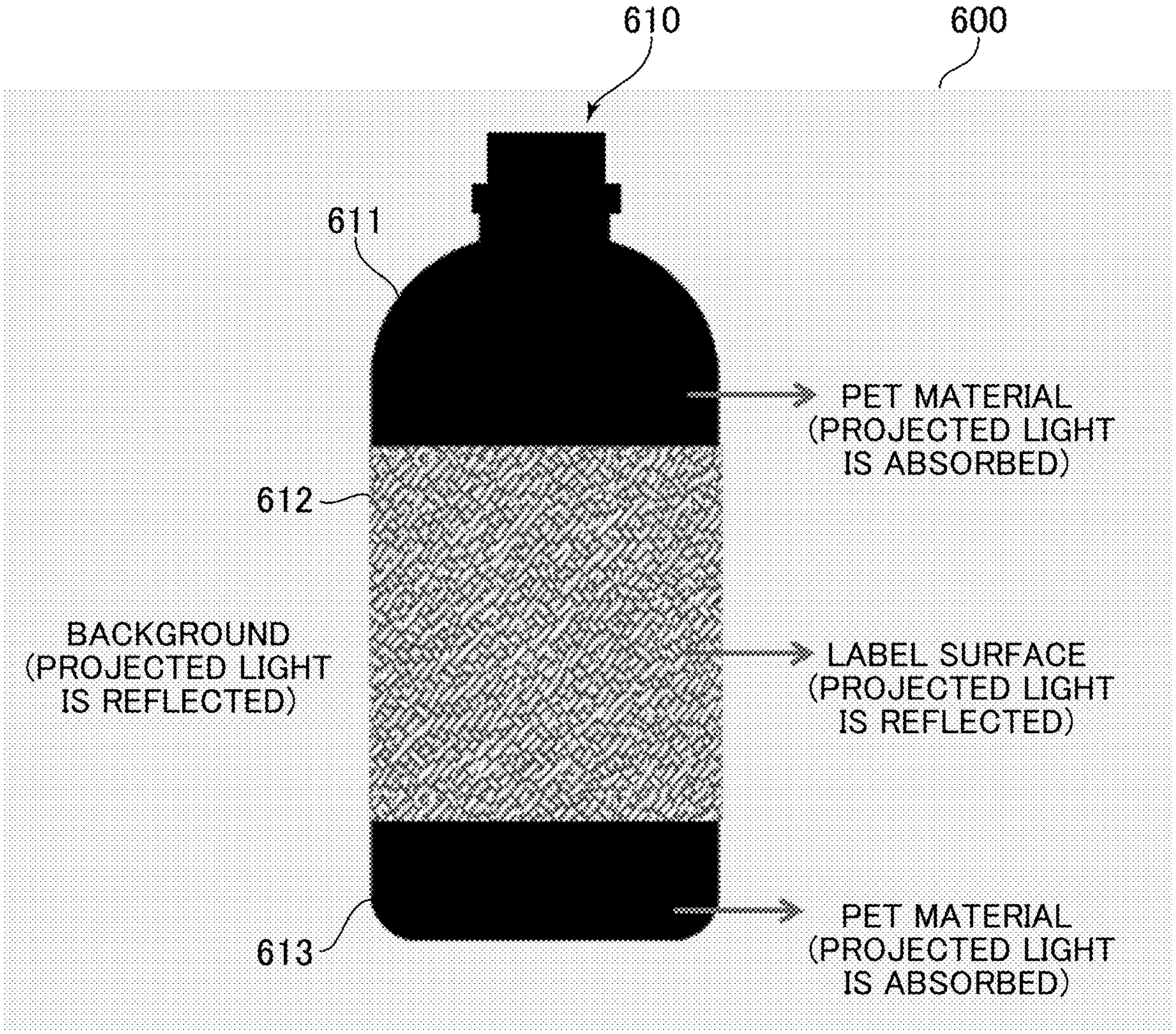
FIG. 6 is an exemplary schematic view for explaining optical absorption property data according to the embodiment.

Thus, in the embodiment, optical absorption property data in which an optical absorption region on the surface of the target is visualized as illustrated in, for example, the following FIG. 6 is acquired as further two-dimensional data on the basis of the image data on the target irradiated with the SWIR light among the above-described three types of image data.

FIG. 6 is an exemplary schematic view for explaining the optical absorption property data according to the embodiment.

In the example illustrated in FIG. 6, an image 600 shows one example of the optical absorption property data acquired by capturing an image of the article 610 irradiated with the SWIR light having a wavelength spectrum that matches an absorption spectrum of the PET material, with the SWIR camera 123. As illustrated in FIG. 6, use of the SWIR light having an appropriate wavelength spectrum enables silhouetting of portions 611 and 613 at which the PET material is exposed in the article 610 and enables visualization of a difference from, for example, a portion 612 (and background of the article 610) corresponding to a label surface wound around the article 610.

Note that the optical absorption material is not limited to the PET material. Thus, in the embodiment, imaging using the SWIR light is performed a plurality of times while changing a wavelength of the SWIR light as appropriate as described above so as to be able to appropriately acquire the optical absorption property data also from an optical absorption material having an absorption spectrum different from the absorption spectrum of the PET material (see FIG. 2).

By combining the three-dimensional data and the two-dimensional data as described above, it is possible to generate a model X' that reproduces appearance of the target as is as illustrated in the following FIG. 7.

Figure 7:
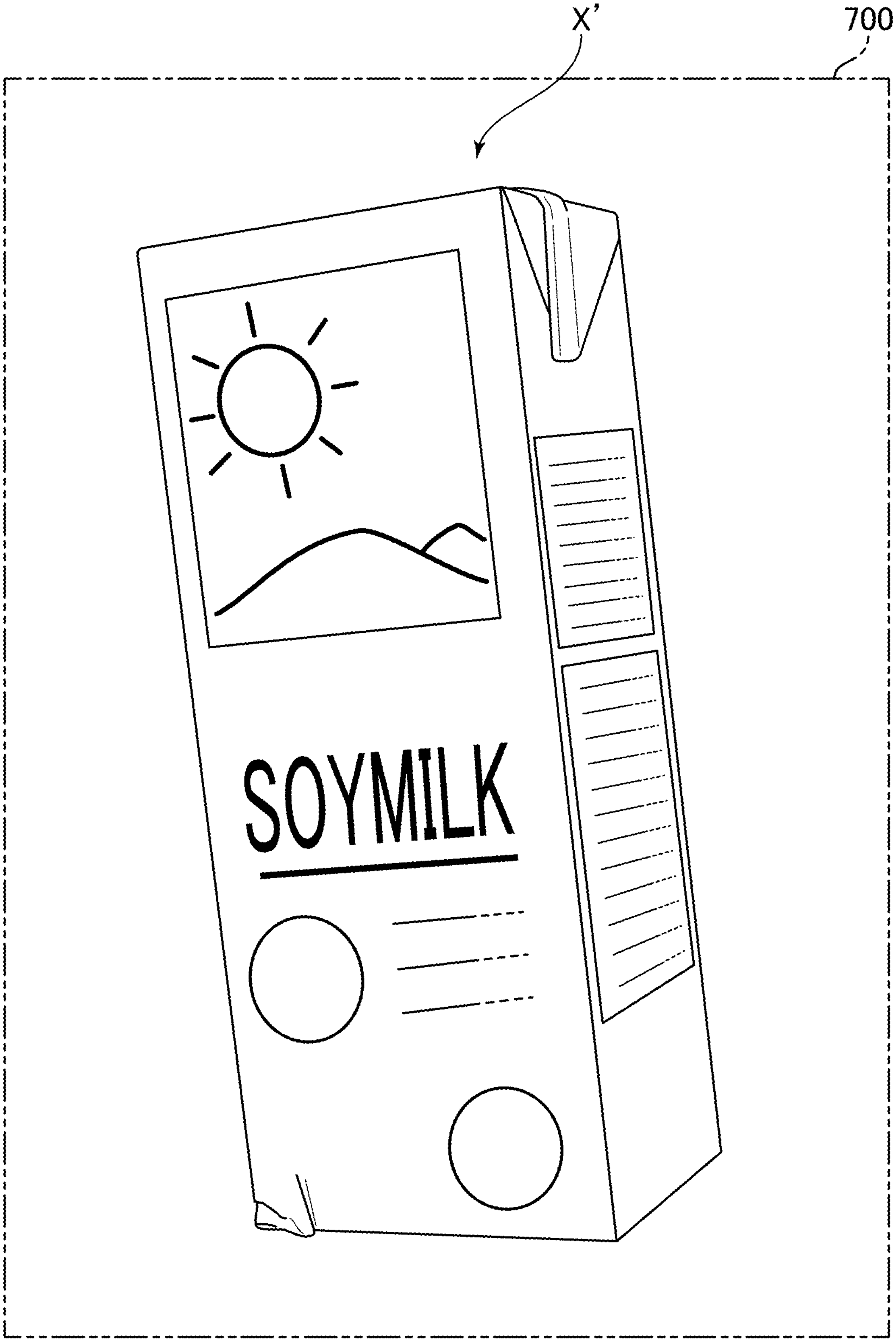
FIG. 7 is an exemplary schematic view for explaining a model in which three-dimensional data and two-dimensional data are combined according to the embodiment.

FIG. 7 is an exemplary schematic view for explaining the model X' obtained by combining the three-dimensional data and the two-dimensional data according to the embodiment.

In the example illustrated in FIG. 7, an image 700 is an image representing the model X' obtained by combining the three-dimensional data and the two-dimensional data corresponding to the article X illustrated in FIG. 3 at a certain viewpoint. This model X' is generated by pasting the texture data illustrated in FIG. 5 to the polygon mesh data based on the point cloud data illustrated in FIG. 4 after positions are aligned.

Here, the model X' illustrated in FIG. 7 reproduces appearance of the article X as is including a region in which a surface shape is distorted (and distortion of characters attached on the region) (see, for example, a corner portion in a lower left part of the paper). Thus, a simple combination of the three-dimensional data and the two-dimensional data cannot necessarily reproduce the entire appearance of the target (particularly, characters) in a computer-readable form. However, if the entire appearance of the target including characters can be reproduced in a computer-readable form, the read information can be utilized in various use cases (specific examples will be described later), which is beneficial.

Thus, in the embodiment, the three-dimensional data is corrected so as to reduce distortion of the surface shape using a method as indicated in the following FIG. 8, and a target digital twin model that reproduces the entire appearance of the target in a computer-readable form is generated using the corrected three-dimensional data.

Figure 8:
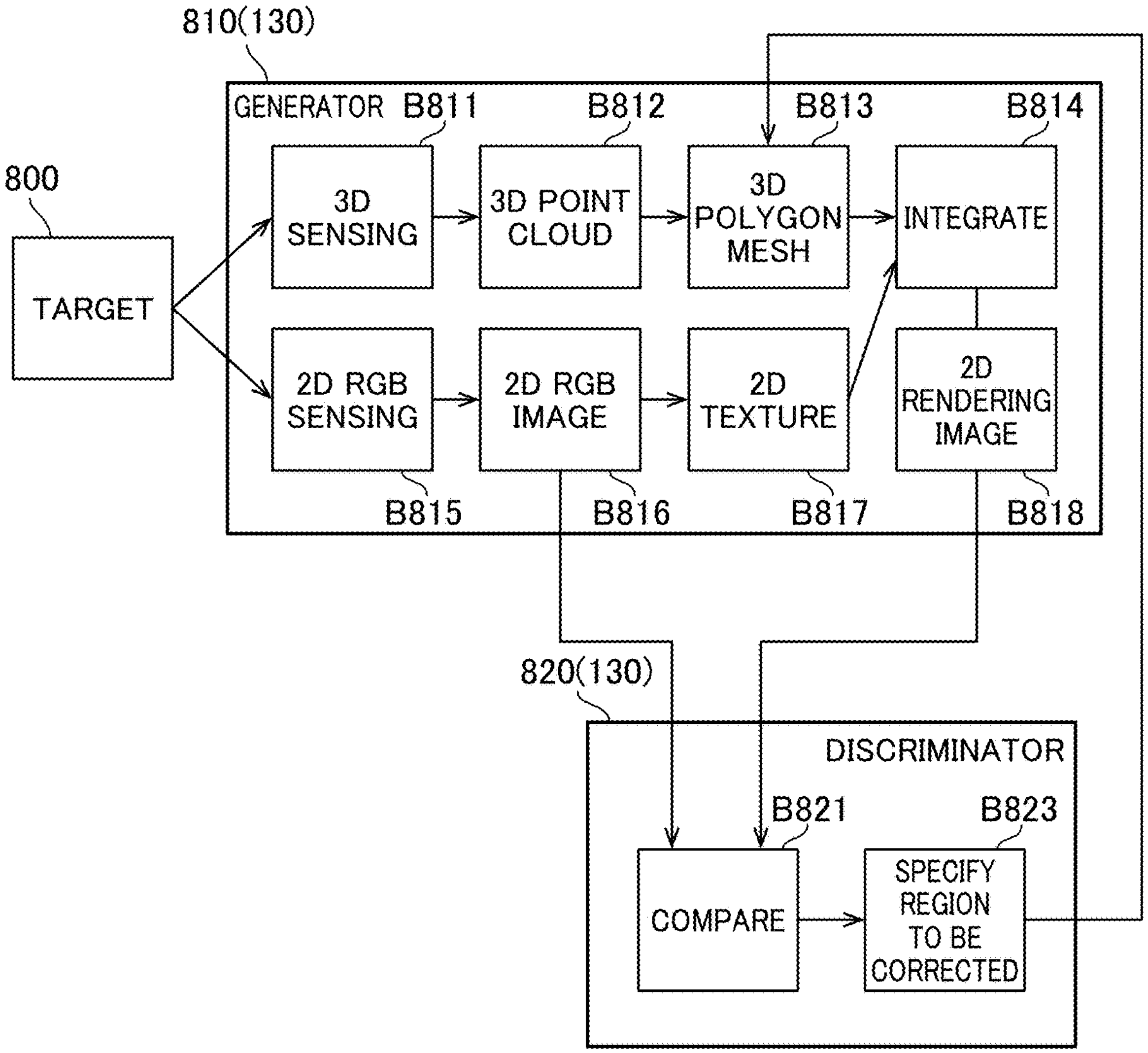
FIG. 8 is an exemplary schematic block diagram for explaining correction of the three-dimensional data according to the embodiment.

FIG. 8 is an exemplary schematic block diagram for explaining correction of the three-dimensional data according to the embodiment.

As illustrated in FIG. 8, the controller 130 according to the embodiment corrects the three-dimensional data acquired on the basis of a target 800 by utilizing a generative adversarial network (GAN) including a generator 810 and a discriminator 820.

More specifically, the generator 810 performs three-dimensional (3D) sensing, for example, imaging of the target 800 using the above-described structured light pattern in a block B811. Then, in a block B812, the generator 810 acquires point cloud data on the basis of image data which is a result of the 3D sensing in the block B811. Then, in a block B813, the generator 810 acquires 3D polygon mesh data on the basis of the point cloud data acquired in the block B812.

Further, the generator 810 performs two-dimensional (2D) sensing, for example, imaging of the target 800 using the above-described RGB light in a block B815. Then, in a block B816, the generator 810 acquires an RGB image which is a result of the 2D sensing in the block B815. Then, in a block B817, the generator 810 acquires texture data on the basis of the RGB image acquired in the block B816.

Then, in a block B814, the generator 810 acquires a model obtained by integrating the polygon mesh data acquired in the block B813 and the texture data acquired in the block B817 while aligning the positions. Then, in a block B818, the generator 810 acquires a rendering model at the same viewpoint as a viewpoint of the) RGB image acquired in the block B816 from the model acquired in the block B814.

Then, in a block B821, the discriminator 820 compares the RGB image (first appearance image) acquired in the block B816 with the rendering image (second appearance image) acquired in the block B818. Then, the discriminator 820 specifies a different region on the basis of the comparison in the block B821 as a region to be corrected on the polygon mesh data and feeds back the region to the generator 810. Then, the generator 810 corrects the polygon mesh data.

Such correction is repeated until a difference between the RGB image and the rendering image becomes equal to or smaller than a predetermined threshold and negligible. By this means, as illustrated in the following FIG. 9, distortion included in the model obtained by integrating the polygon mesh data and the texture data is corrected, so that the target digital twin model that reproduces the entire appearance of the target 800 including characters in a computer-readable form can be generated.

Figure 9:
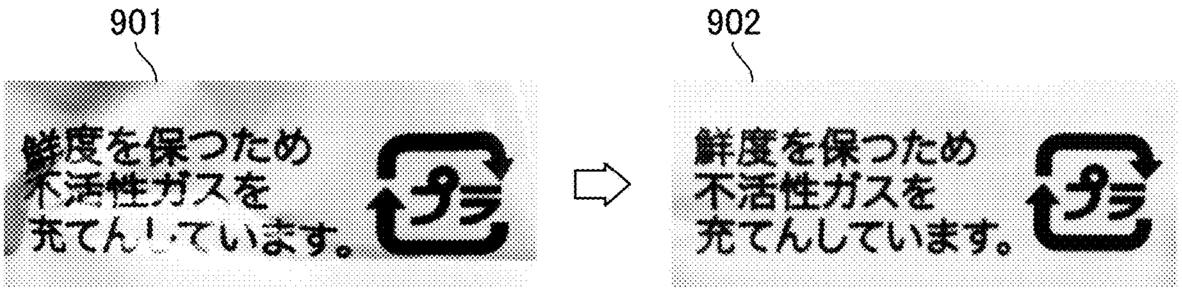
FIG. 9 is an exemplary schematic view illustrating a result of correction of the three-dimensional data according to the embodiment.

FIG. 9 is an exemplary schematic view illustrating a result of correction of the three-dimensional data according to the embodiment.

In the example illustrated in FIG. 9, an image 901 shows a region which can be included in a model before correction of the three-dimensional data described above is performed and on which distorted characters (and a figure) are attached, and an image 902 shows a region corresponding to the image 901 in a target digital twin model generated through correction of the three-dimensional data described above. As illustrated in FIG. 9, according to correction of the three-dimensional data described above, it is possible to correct distorted characters (and figures) to a computer-readable level.

According to the target digital twin model generated through correction of the three-dimensional data described above, additional information added to the surface of the target as characters or figures can be easily read using a character recognition system or an image recognition system in the related art.

Figure 10:
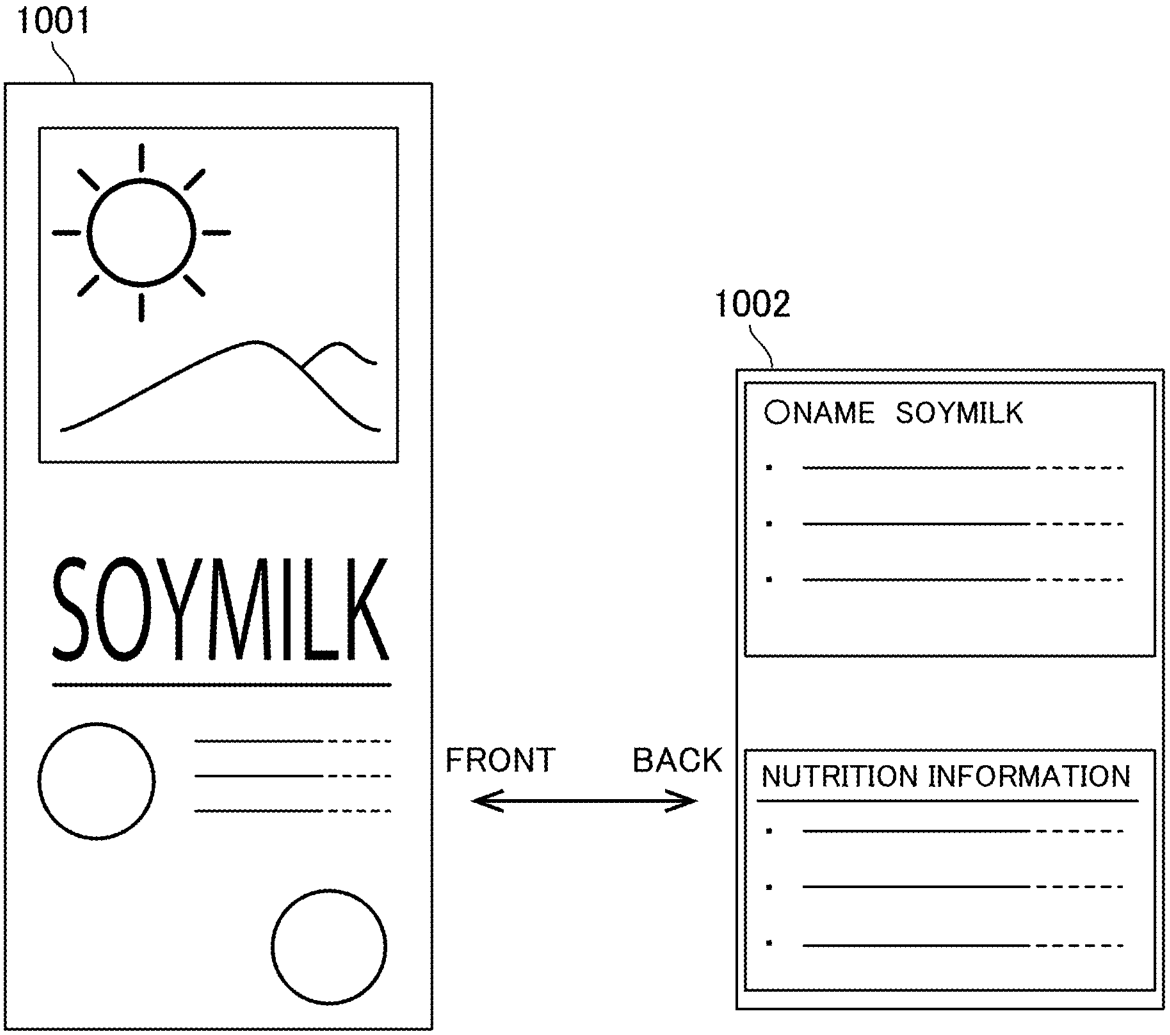
FIG. 10 is an exemplary schematic view for explaining additional information according to the embodiment.

FIG. 10 is an exemplary schematic view for explaining the additional information according to the embodiment.

In the example illustrated in FIG. 10, an image 1001 shows one surface (front surface) of the target digital twin model of the article X illustrated in FIG. 3, and an image 1002 shows a surface (back surface) opposite to the surface illustrated in the image 1001, of the target digital twin model of the article X illustrated in FIG. 3. As illustrated in FIG. 10, a trademark, name and explanation of a product, name and address of a manufacturer, nutrient components, and the like, can be acquired from the target digital twin model as the additional information.

In this manner, various information can be acquired from the target digital twin model. By unifying these information, target master data that is a comprehensive database regarding the target can be generated.

Conventionally, a database of information regarding an article has been created so as to smoothly perform commodity distribution and commercial distribution processes. While typical management items are different depending on business types, the management items include “product ID”, “product name”, “manufacturer”, “supplier”, “distributor”, “category”, “shape”, “color”, “purchase price”, “target selling price”, “thumbnail photo of product”, and the like.

However, conventionally, work of creating a database of these management items has been basically done manually, and a work delay of creating a database of a wide variety of articles has been a big issue.

Further, conventionally, management items to be included in a database have been mainly directed to commodity distribution and sale management, and management items useful from a viewpoint of consumers or from a viewpoint of marketing have not yet been actively expanded in the database. The reasons include that as far as the database is utilized in commodity distribution and sales management, minimum necessary requirements can be satisfied only with limited management items described above, and that there is a bottleneck of necessity of enormous man-hour, a working period, and cost to maintain additional information sources and create a database of additional management items.

While there is a possibility that a comprehensive database regarding articles can be partially implemented if the enormous man-hour, working period and cost as described above are allowed, considering that the number of typically distributed articles is from several hundreds to several thousands, it is substantially impossible to allow the enormous man-hour, working period and cost as described above.

In contrast, in the embodiment, target master data 1100 that is a comprehensive database regarding the target as illustrated in the following FIG. 11 can be easily generated by the target digital twin model generation system 100 described above, and thus, the embodiment is significantly advantageous compared to the related art in terms of man-hour, a working period and cost.

FIG. 11 is an exemplary schematic view for explaining the target master data 1100 according to the embodiment.

As shown in FIG. 11, various items 1101 to 1115 can be registered in the target master data 1100 according to the embodiment.

The items 1101 to 1103 are data based on conventionally used management items. The item 1101 is identification information arbitrarily assigned to a target article (object, product). The item 1102 is an existing product code utilized in a distribution process of the product. The item 1103 is various kinds of product information associated with the existing product code. The product code and the product information can be acquired from the above-described additional information added to the surface of the target as characters or figures which are recognized from the target digital twin model using the character recognition system or the image recognition system.

The items 1104 to 1108 are new data which can be acquired on the basis of the technique of the embodiment. The item 1104 is data indicating a three-dimensional shape over an entire circumference of the surface of the target, which can be acquired on the basis of the above-described target digital twin model. The item 1105 is data indicating texture of the surface of the target, which can be acquired on the basis of the above-described target digital twin model. The items 1106 and 1107 are the above-described additional information added to the surface of the target as characters or figures which are recognized from the target digital twin model using the character recognition system or the image recognition system. The item 1108 is information which can be registered in a case where change is made in the items 1104 to 1107.

Here, the items 1109 to 1116 are data groups which are particularly useful when handling (picking) of the target is performed by a robot 1310 (see FIG. 13 described later) in a commodity distribution process. The item 1109 is data regarding an optimal gripping position or region of the target, and the item 1110 is data regarding a position where the product code is located in the article (object). The item 1111 is data indicating a position of a center of gravity of the object, the item 1112 is data regarding stiffness or deformation of the object, and the item 1113 is data regarding physical property of a surface of the object. The item 1114 is data regarding an optimal gripper for gripping the object, and the item 1115 is data regarding a transparent material which can be included in the object. The item 1116 is data regarding a region of the object, which requires attention in handling. These data groups are handling information that can be acquired as a result of performing a simulation of handling of the target by the robot 1310 and learning optimal handling of the target. Note that a configuration in which handling of the target is performed by the robot 1310 by utilizing the target master data 1100 will be described later, and thus, further description will be omitted here.

With the above-described configuration, the target digital twin model generation system 100 according to the embodiment executes processing along the flow as shown in the following FIG. 12.

Figure 12:
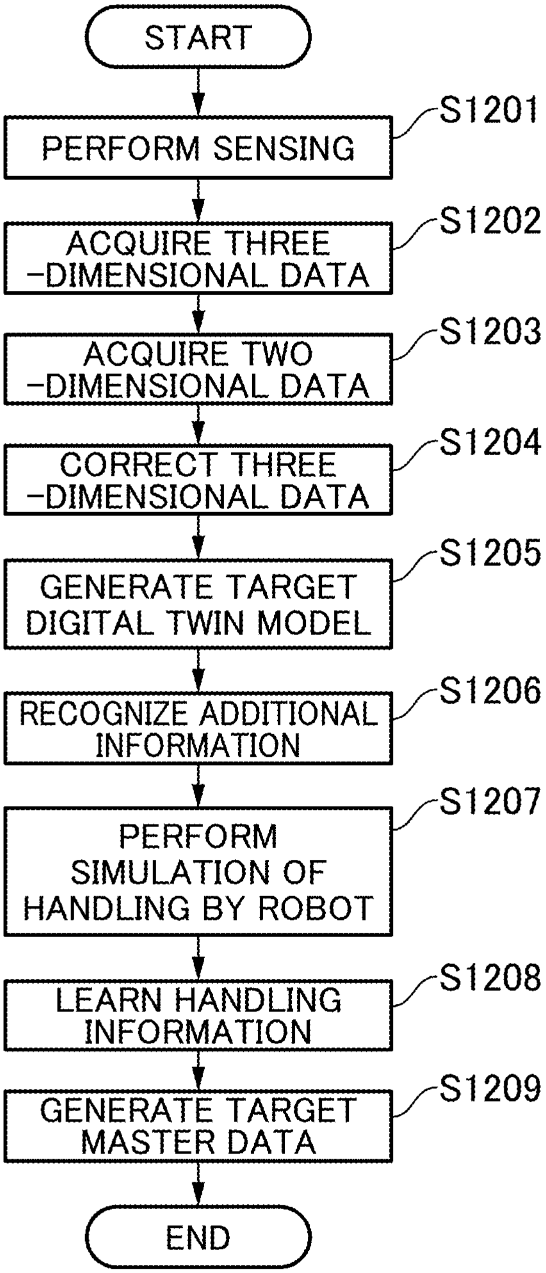
FIG. 12 is an exemplary schematic flowchart showing processing to be executed by the target digital twin model generation system according to the embodiment.

FIG. 12 is an exemplary schematic flowchart showing processing to be executed by the target digital twin model generation system 100 according to the embodiment.

As shown in FIG. 12, in the embodiment, first, in step S1201, the controller 130 performs sensing of the target through timing control as illustrated in FIG. 2 using the illumination generator 110 and the sensor system 120. In other words, the controller 130 acquires image data indicating the target irradiated with the structured light pattern, image data indicating the target irradiated with the RGB light, and image data indicating the target irradiated with the SWIR light.

Then, in step S1202, the controller 130 acquires three-dimensional data (the point cloud data and the polygon mesh data described above) indicating a three-dimensional shape over the entire circumference of the surface of the target on the basis of the image data indicating the target irradiated with the structured light pattern.

Then, in step S1203, the controller 130 acquires two-dimensional data (the texture data and the optical absorption property data described above) indicating two-dimensional appearance over the entire circumference of the target on the basis of the image data indicating the target irradiated with the RGB light and the image data indicating the target irradiated with the SWIR light.

Then, in step S1204, the controller 130 corrects the polygon mesh data as the three-dimensional data using the GAN which uses the generator 810 and the discriminator 820 described above.

Then, in step S1205, the controller 130 generates the target digital twin model that reproduces the entire appearance of the target by integrating the corrected three-dimensional data and the two-dimensional data while aligning each other's positions.

Then, in step S1206, the controller 130 recognizes additional information added to the surface of the target digital twin model as characters of figures by utilizing the character recognition system or the image recognition system.

Then, in step S1207, the controller 130 performs a simulation of handling by the robot 1310 (see FIG. 13 described later) and learns handling information for implementing optimal handling of the target represented by the target digital twin model.

Then, in step S1208, the controller 130 creates a database of various kinds of information acquired through the above-described processing to generate the target master data 1100. Then, the processing ends.

As described above, the target digital twin model generation system 100 according to the embodiment includes the projector 121 and the SWIR light source 122 as a light output that outputs planar light having a predetermined pattern and light having a plurality of wavelengths including visible light and invisible light to the target from a plurality of illumination positions that surround the target at different timings. The target digital twin model generation system 100 also includes the SWIR camera 123 and the visible light camera 124 as an imager that captures images of the target irradiated with the planar light and the target irradiated with the light having the plurality of wavelengths at a plurality of imaging positions corresponding to the plurality of illumination positions in synchronization with timings at which the planar light and the light having the plurality of wavelengths are respectively output. Further, the target digital twin model generation system 100 includes the controller 130 that controls the projector 121, the SWIR light source 122, the SWIR camera 123, and the visible light camera 124. The controller 130 acquires three-dimensional data indicating a three-dimensional shape over the entire circumference of the surface of the target on the basis of an imaging result of the target irradiated with the planar light, acquires two-dimensional data indicating two-dimensional appearance over the entire circumference of the target viewed from the plurality of imaging positions on the basis of imaging results of the target sequentially irradiated with the light having the plurality of wavelengths and generates the target digital twin model that reproduces the appearance of the target in a computer-readable form by associating the three-dimensional data with the two-dimensional data.

According to the above-described configuration, by acquiring information indicating the three-dimensional shape and two-dimensional information together and integrating the information as the target digital twin model, information regarding the appearance of the target can be exhaustively acquired.

Here, in the embodiment, the controller 130 acquires texture data indicating texture of the surface of the target as the above-described two-dimensional data on the basis of an imaging result of the target irradiated with the visible light. Further, the controller 130 acquires optical absorption property data in which an optical absorption region on the surface of the target is visualized as the two-dimensional data on the basis of an imaging result of the target irradiated with the invisible light.

According to the above-described configuration, even in a case where the optical absorption region at least partially exists on the surface of the target, accurate two-dimensional data can be acquired from two types of data utilizing the visible light and the invisible light.

Further, in the embodiment, the controller 130 includes the generator 810 that generates a first appearance image (see the block B818 in FIG. 8) indicating appearance of the target at a certain viewpoint from a model generated by pasting the texture data to the three-dimensional data. Further, the controller 130 includes the discriminator 820 that discriminates a difference between the first appearance image generated by the generator 810 and a second appearance image (see the block B816 in FIG. 8) which is generated from an imaging result of the target irradiated with the visible light and which indicates the appearance of the target at the same viewpoint as the viewpoint of the first appearance image. Then, the controller 130 corrects the three-dimensional data so that the difference discriminated by the discriminator 820 becomes smaller on the basis of the generator 810 and the discriminator 820 and generates the target digital twin model by associating the corrected three-dimensional data with the two-dimensional data.

According to the above-described configuration, as a result of distortion of the three-dimensional shape of a surface of the target digital twin model being corrected through correction of the three-dimensional data, distortion of the two-dimensional appearance of the surface of the target digital twin model is also corrected, so that it is possible to improve reproducibility of the target by the target digital twin model.

Further, in the embodiment, the controller 130 recognizes additional information added to the surface of the target as characters or figures on the basis of the two-dimensional appearance of the target acquired from the target digital twin model and generates the target master data 1100 as a comprehensive database regarding the target, in which the additional information is registered along with the three-dimensional data and the two-dimensional data.

According to the above-described configuration, it is possible to exhaustively manage all the information regarding the appearance of the target by utilizing the target master data 1100.

Further, in the embodiment, the controller 130 acquires a product code and product information associated with the target on the basis of the additional information and further registers the acquired product code and product information in the target master data 1100.

According to the above-described configuration, it is possible to manage the product code and the product information by the target master data 1100 as useful information.

Further, in the embodiment, the controller 130 learns handling information for implementing optimal handling of the target, including an optimal gripping position of the target by performing a simulation of handling of the target by the robot 1310 (see FIG. 13 described later) and further registers the learned handling information in the target master data 1100.

According to the above-described configuration, it is also possible to integrally manage the handling information that is particularly useful when handling of the target is performed by the robot 1310 (see FIG. 13 described later) by the target master data 1100.

Examples of various use cases of the target master data 1100 according to the embodiment will be described below.

First, an example of a case where the target master data 1100 according to the embodiment is utilized in handling by the robot 1310 in the commodity distribution process, or the like, will be described with reference to FIGS. 13 and 14.

Figure 13:
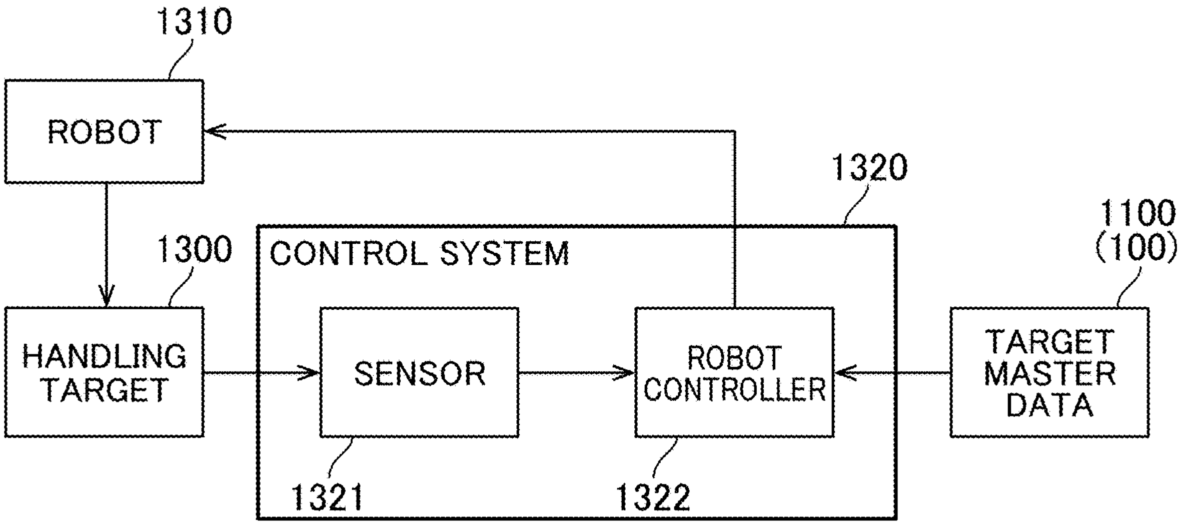
FIG. 13 is an exemplary schematic block diagram illustrating a configuration of a control system that controls a robot by utilizing the target master data according to the embodiment.

FIG. 13 is an exemplary schematic block diagram illustrating a configuration of a control system 1320 that controls the robot 1310 by utilizing the target master data 1100 according to the embodiment.

As illustrated in FIG. 13, the robot 1310 includes a robot arm and a gripper (which are not illustrated) and is configured to be able to approach arbitrary selected one of a plurality of handling targets 1300 and perform handling of the handling target 1300.

The control system 1320 includes a sensor 1321 and a robot controller 1322. The sensor 1321 is configured to detect information regarding appearance of the handling target 1300. This sensor 1321 may be any sensor as long as information regarding appearance can be detected at a level at which a product code and product information (above-described additional information) added to the handling target 1300 can be acquired. The robot controller 1322 includes a control circuit such as a processor and controls the robot 1310 so as to handle the handling target 1300 in an optimal form on the basis of the information acquired from the sensor 1321 and the target master data 1100 acquired from the above-described target digital twin model generation system 100.

Note that while in the example illustrated in FIG. 13, the sensor 1321 is included in the control system 1320, the sensor 1321 may be included in the robot 1310. Further, while in the example illustrated in FIG. 13, the robot controller 1322 acquires the target master data 1100 from outside, the target master data 1100 may be stored in the control system 1320 in advance.

Figure 14:
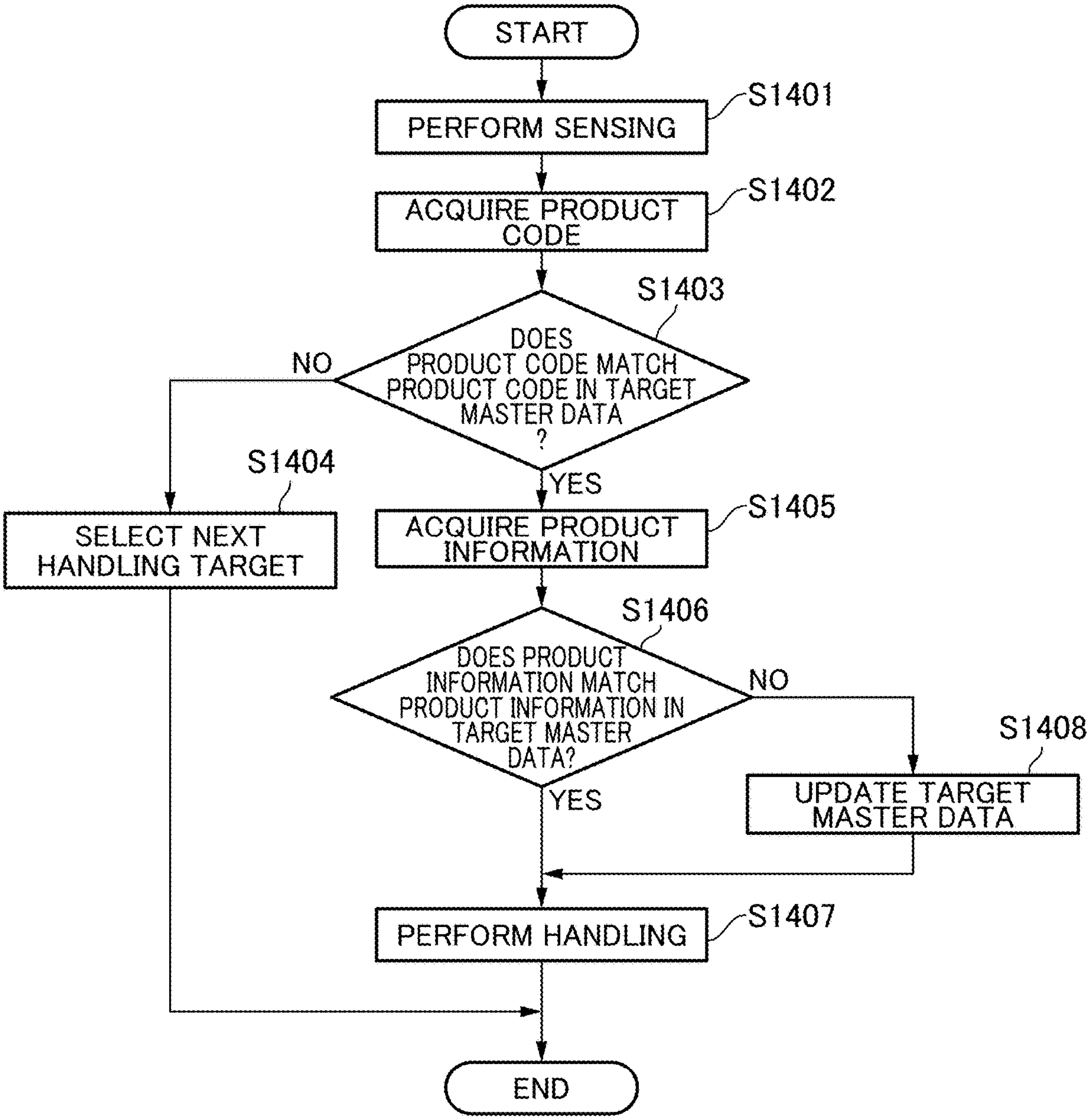
FIG. 14 is an exemplary schematic flowchart showing processing to be executed by the control system according to the embodiment.

FIG. 14 is an exemplary schematic flowchart showing processing to be executed by the control system 1320 according to the embodiment. A series of processing shown in FIG. 14 can be repeatedly executed, for example, until handling of all of a plurality of handling targets 1300 is completed.

As shown in FIG. 14, in the embodiment, first, the robot controller 1322 performs sensing by the sensor 1321 and acquires information regarding the appearance of the handling target 1300 in step S1401.

Then, in step S1402, the robot controller 1322 acquires a product code attached on the handling target 1300 from a result of the sensing in step S1401.

Then, in step S1403, the robot controller 1322 determines whether the product code acquired in step S1402 matches a product code registered in the target master data 1100.

In a case where it is determined in step S1403 that the product code acquired in step S1402 does not match the product code registered in the target master data 1100, the processing proceeds to step S1404.

Then, in step S1404, the robot controller 1322 selects the next handling target 1300. In this event, in a case where it is assumed that the same product code is attached to all of the plurality of handling targets 1300, it is determined that a wrong product is mixed, and another handling target 1300 is selected after the wrong product is removed. Further, in a case where it is assumed that different product codes are attached to the plurality of handling targets 1300, it is determined that some kind of error merely occurs, and another handling target 1300 is selected. Then, the processing ends.

On the other hand, in a case where it is determined in step S1403 that the product code acquired in step S1402 matches the product code registered in the target master data 1100, the processing proceeds to step S1405.

Then, in step S1405, the robot controller 1322 acquires the product information as the additional information added to the handling target 1300 from a result of the sensing in step S1401.

Then, in step S1406, the robot controller 1322 determines whether the product information acquired in step S1405 matches the product information as the additional information registered in the target master data 1100.

In a case where it is determined in step S1406 that the product information acquired in step S1405 matches the product information registered in the target master data 1100, the processing proceeds to step S1407.

Then, in step S1407, the robot controller 1322 controls the robot 1310 on the basis of the handling information registered in the target master data 1100 and performs handling of the handling target 1300 using an optimal method in accordance with the handling target 1300. Then, the processing ends.

On the other hand, in a case where it is determined in step S1406 that the product information acquired in step S1405 does not match the product information registered in the target master data 1100, the processing proceeds to step S1408. In this case, it can be determined that change has been made in the product information due to change of a manufacturing lot, influence of limited time promotion, or the like.

Thus, in this case, in step S1408, the robot controller 1322 updates the target master data 1100 on the basis of the product information acquired in step S1405. Then, the robot controller 1322 performs handling of the handling target 1300 in the above-described step S1407. Then, the processing ends.

As described above, the control system 1320 of the robot 1310 according to the embodiment includes the sensor 1321 and the robot controller 1322. The sensor 1321 detects information regarding the appearance of the handling target 1300 of the robot 1310. The robot controller 1322 controls the robot 1310 to perform handling of the handling target 1300 on the basis of the detection result of the information regarding the appearance of the handling target 1300 and the handling information of the target master data 1100 from the above-described target digital twin model generation system 100.

According to the above-described configuration, it is possible to appropriately perform handling of the handling target 1300 by utilizing the handling information registered in the target master data 1100.

Note that in the embodiment, the robot controller 1322 can acquire the product code added to the handling target 1300 from the detection result of the information regarding the appearance of the handling target 1300 and can control the robot 1310 to perform handling of another handling target 1300 in a case where the acquired product code is different from the product code registered in the target master data 1100.

According to the above-described configuration, it is possible to prevent handling of a wrong handling target 1300 by collating the product code.

Further, in the embodiment, in a case where the product code acquired from the detection result of the information regarding the appearance of the handling target 1300 matches the product code registered in the target master data 1100, the robot controller 1322 can acquire the product information added to the surface of the handling target 1300 from the detection result of the information regarding the appearance of the handling target 1300, and in a case where the acquired product information is different from the product information registered in the target master data 1100, the robot controller 1322 can update the target master data 1100 on the basis of the acquired additional information.

According to the above-described configuration, it is also possible to update the product information registered in the target master data 1100 in accordance with change of the product information due to change of a manufacturing lot, influence of limited time promotion, or the like.

An example of a case where the target master data 1100 according to the embodiment is utilized to provide a virtual shop in electronic commerce (EC) business will be described next with reference to FIGS. 15 to 17.

Figure 15:
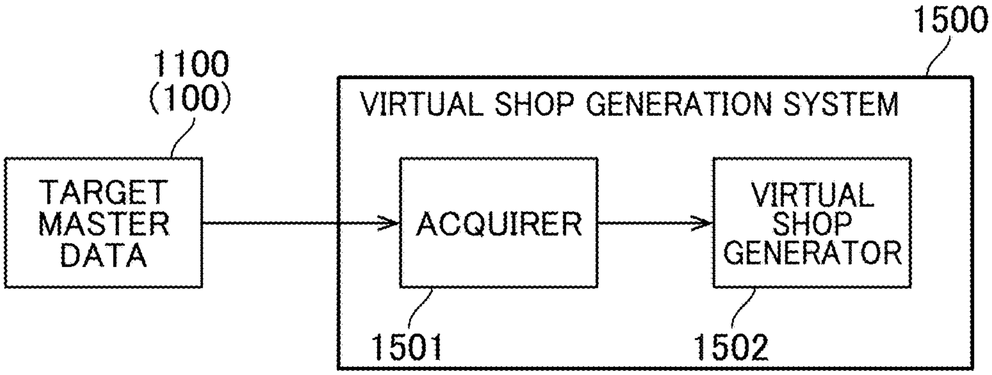
FIG. 15 is an exemplary schematic block diagram illustrating a configuration of a virtual shop generation system that utilizes the target master data according to the embodiment.

FIG. 15 is an exemplary schematic block diagram illustrating a configuration of a virtual shop generation system 1500 utilizing the target master data 1100 according to the embodiment.

As illustrated in FIG. 15, the virtual shop generation system 1500 includes an acquirer 1510 and a virtual shop generator 1520. The acquirer 1510 and the virtual shop generator 1520 may be implemented by hardware with a dedicated circuit or may be implemented by software as a result of a predetermined computer program being executed by a processor as a control circuit that comprehensively controls the virtual shop generation system 1500.

The acquirer 1510 acquires the target master data 1100 from the above-described target digital twin model generation system 100. Then, the virtual shop generator 1502 generates a virtual shop such as the one illustrated in the following FIG. 16 by displaying one or more target digital twin models generated from the target master data 1100 acquired by the acquirer 1510 on a virtual space while simulating an actual shop.

Figure 16:
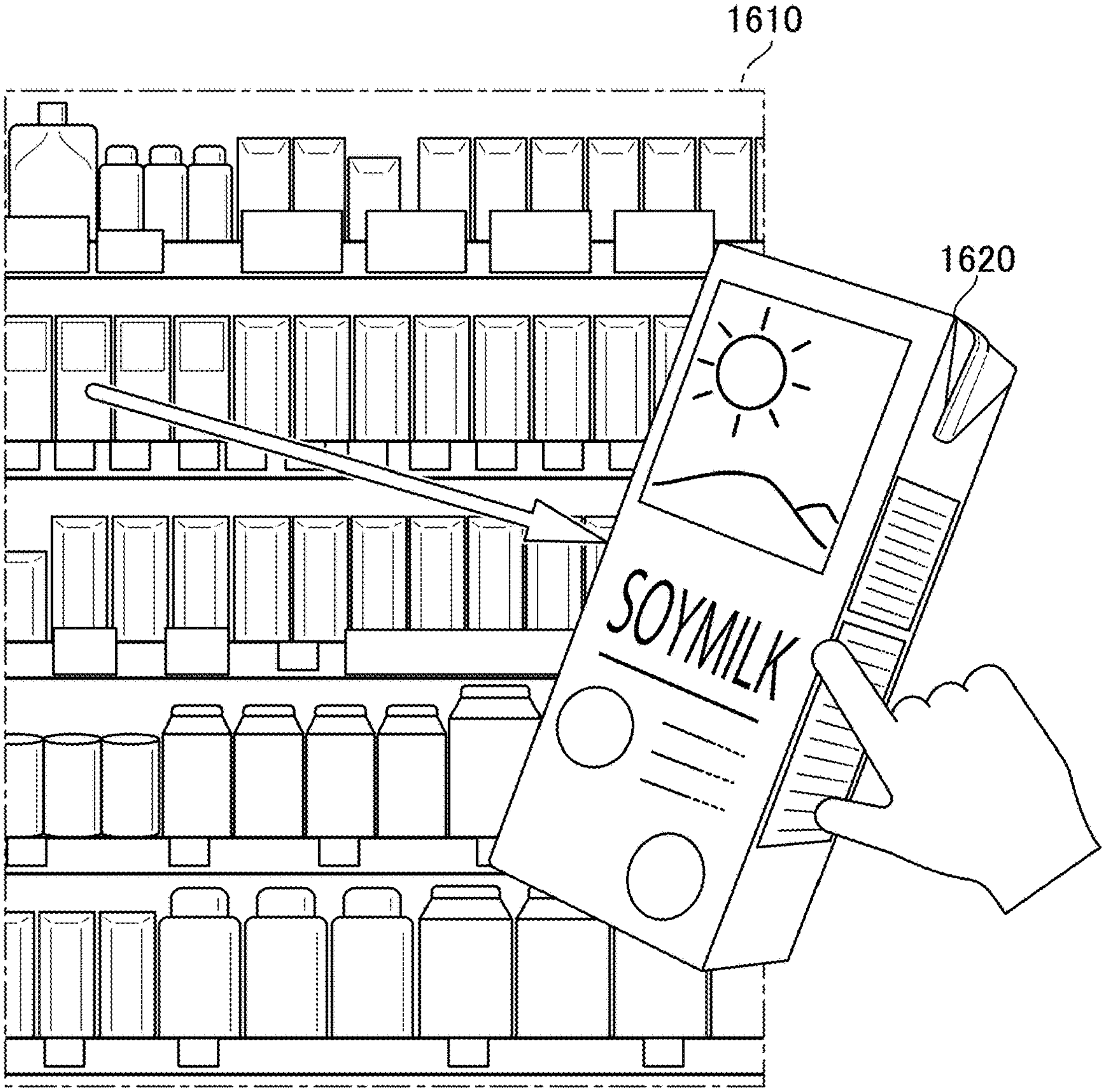
FIG. 16 is an exemplary schematic view for explaining a virtual shop generated by the virtual shop generation system according to the embodiment.

FIG. 16 is an exemplary schematic view for explaining the virtual shop generated by the virtual shop generation system 1500 according to the embodiment.

As illustrated in FIG. 16, the virtual shop generator 1502 virtually generates a product shelf 1610 on which a number of products that are modeled as the target digital twin models are displayed, for example, in a visually presentable form to a user terminal via a network. A user can select a desired product 1620 by performing operation of picking up a product from the product shelf 1610 using a touch panel, or the like, provided on the user terminal and can confirm information acquired from appearance of the desired product 1620 in details.

Figure 17:
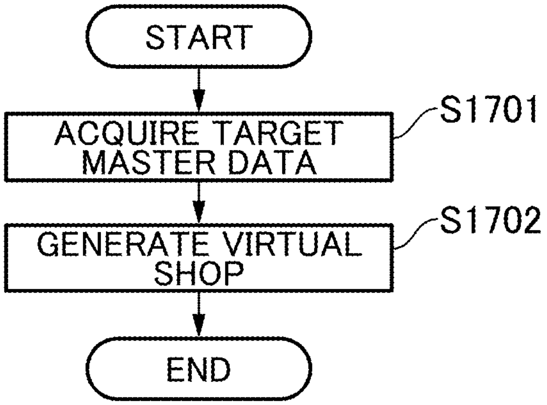
FIG. 17 is an exemplary schematic flowchart showing processing to be executed by the virtual shop generation system according to the embodiment.

FIG. 17 is an exemplary schematic flowchart showing processing to be executed by the virtual shop generation system 1500 according to the embodiment.

As shown in FIG. 17, in the embodiment, first, in step S1701, the acquirer 1501 acquires the target master data 1100 generated by the above-described target digital twin model generation system 100.

Then, in step S1702, the virtual shop generator 1502 generates a virtual shop by generating one or more target digital twin models from the target master data 1100 acquired in step S1701 and displaying the generated target digital twin models on a virtual space while simulating an actual shop. Then, the processing ends.

As described above, the virtual shop generation system 1500 according to the embodiment includes the acquirer 1501 and the virtual shop generator 1502. The acquirer 1501 acquires the target master data 1100 from the above-described target digital twin model generation system 100. The virtual shop generator 1502 generates a virtual shop that virtually reproduces a store in which products associated with the product codes and the product information registered in the target master data 1100 acquired by the acquirer 1501 are arbitrarily displayed.

According to the above-described configuration, it is possible to easily provide a virtual shop that simulates an actual shop by effectively utilizing the target digital twin model and the target master data 1100.

Note that as described above, the target master data 1100 covers information regarding the appearance of the target. Thus, by utilizing the target master data 1100, for example, in a case where the target is food, it is possible to generate a virtual shop that can appropriately provide useful information such as notification regarding whether a specific allergic substance which should be avoided and which can exist for each user is contained, notification of information for calorie control, recommendation of well-balanced meal, recommendation that responds to preference of a place of origin, a manufacturer, a material, and the like, and notification regarding whether food that should be avoided for religious reasons is contained.

The useful information as described above is typically added to a package as readable characters or figures on the basis of the laws, industrial guidelines, or the like, for each type of product including medicine or cosmetics. However, despite the useful information, a size of characters or figures indicating the information tend to be relatively small due to a size of the package, and the information may not be read unless the user brings his/her eyes pretty close to the information. The EC business has a hidden issue that nevertheless the user cannot pick up and confirm an actual product, useful information is not necessarily exhaustively provided on a website.

In contrast, according to the technique of the embodiment, it is possible to provide to a user an experience as if the user actually picked up and looked around the article on a virtual space via a network by utilizing the target master data 1100 in which detailed information regarding the appearance that can be acquired by utilizing target digital twin models of a wide variety of articles existing in the real world is registered. In addition, it is possible to provide, to the user, an unconventional, novel user experience (UX), such as enabling enlargement of small characters or figures which is difficult in the real world.

Further, the information registered in the target master data 1100 is digital information, and thus, it is also possible to interactively implement exhaustive search for a desired article and a wide variety of personalized settings in accordance with individual users, and to introduce novel services significantly beyond conventional EC services.

Further, by monitoring the user action of picking up a product on a virtual space, it is possible to measure a degree of the user interest in the product in real time. Still further, by providing some variations in design of the package and net content, an AB test that interactively measures response of the user until the user purchases the product, or the like can be performed, so that it becomes possible to implement an unconventional, new real-time marketing approach, insertion of dynamic advertisements, and the like.

Further, the virtual shop is merely constructed on the virtual space, and thus, a virtual product shelf on which an enormous number of product groups equal to or more than product groups in an actual shop are densely displayed can be reproduced without physical or economic constraints. By this means, similar experience can be effectively obtained on the virtual space without an actual shop being actually set up, so that many problems such as securing of a construction site for the actual shop, construction of the actual shop, introduction of various kinds of facilities to the actual shop, arrangement of employees, maintenance of a delivery system and inventory management can be solved.

Note that according to the technique of the embodiment, as illustrated in the following FIG. 18, an actual shop 1810 can be made to coordinate with a virtual shop 1820.

Figure 18:
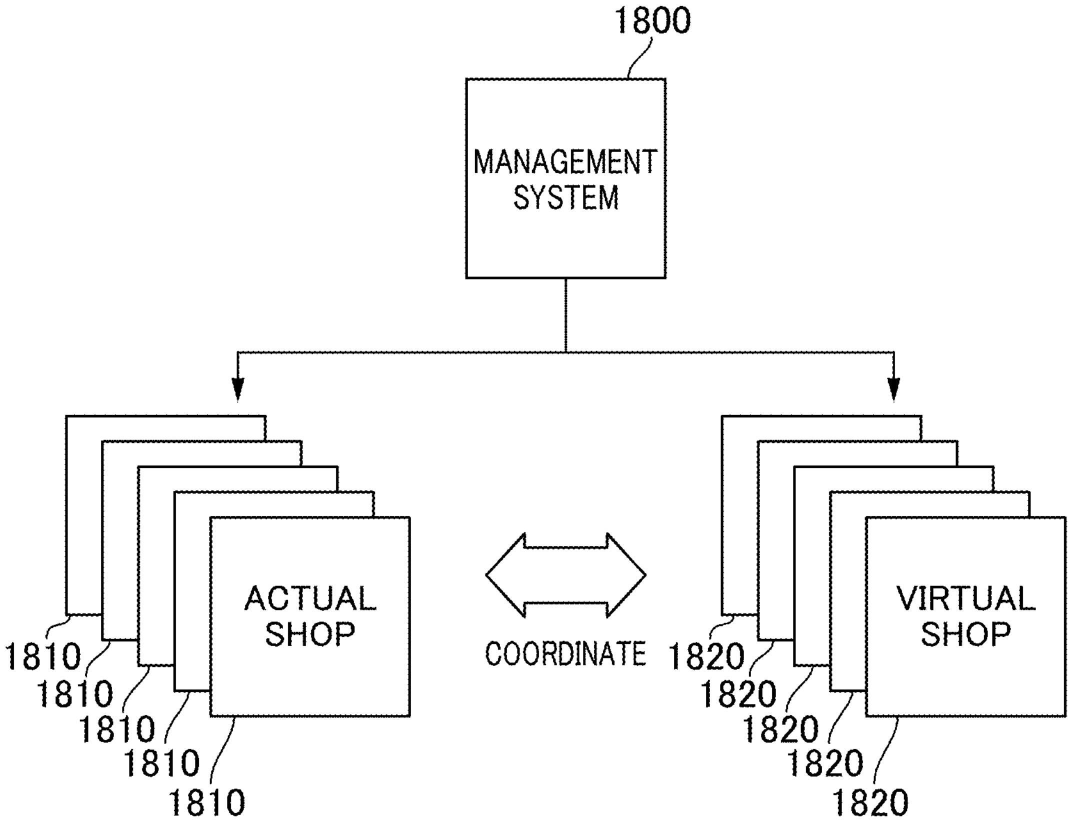
FIG. 18 is an exemplary schematic block diagram illustrating a commercial distribution system utilizing the virtual shop according to the embodiment.

FIG. 18 is an exemplary schematic block diagram illustrating a management system 1800 that manages commercial distribution by utilizing both the actual shop and the virtual shop by way of the technique of the embodiment.

As illustrated in FIG. 18, the management system 1800 is configured to manage the actual shop 1810 and the virtual shop 1820 while making them coordinate with each other. According to such a configuration, the actual shop 1810 that is strategically deployed can also be utilized as a service point at which a product purchased at the virtual shop 1820 can be picked up or as a delivery base to a neighboring customer. This can make experience at the actual shop and experience at the virtual shop limitlessly seamless, so that it is possible to implement commercial distribution with high convenience and high economic reasonableness both from a viewpoint of a business operator and a viewpoint of consumers.

While some embodiments of the present disclosure have been described above, these embodiments are presented as examples and are not intended to limit the scope of the invention. These new embodiments can be implemented in other various forms, and various omission, replacement and modification can be made within a range not departing from the gist of the invention. These embodiments and variations thereof are included in the scope and the gist of the invention and are included in a range of the invention recited in the claims or equivalent range thereof.

REFERENCE SIGNS LIST

100 Target digital twin model generation system
121 Projector (light output)
122 SWIR light source (light output)
123 SWIR camera (imager)
124 Visible light camera (imager)
130 Controller
1100 Target master data
1300 Handling target
1310 Robot
1320 Control system
1321 Sensor
1322 Robot controller
1500 Virtual shop generation system
1501 Acquirer
1502 Virtual shop generator

The invention claimed is:

1. A target digital twin model generation system comprising:

a light output configured to output planar light having a predetermined pattern and light, which includes visible light and invisible light to a target, having a plurality of wavelengths, from a plurality of illumination positions that surround the target at different timings;

an imager configured to individually capture images of the target irradiated with the planar light and the target sequentially irradiated with the light having the plurality of wavelengths, at a plurality of imaging positions corresponding to the plurality of illumination positions in synchronization with timings at which the planar light and the light having the plurality of wavelengths are respectively output; and a controller configured to control the light output and the imager, wherein the controller acquires three-dimensional data indicating a three-dimensional shape over an entire circumference of a surface of the target on a basis of an imaging result of the target irradiated with the planar light, acquires two-dimensional data indicating a two-dimensional appearance over the entire circumference of the target viewed from the plurality of imaging positions on a basis of imaging results of the target sequentially irradiated with the light having the plurality of wavelengths, and generates a target digital twin model that reproduces appearance of the target in a computer-readable form by associating the three-dimensional data with the two-dimensional data, wherein the controller acquires texture data indicating texture of the surface of the target as the two-dimensional data on a basis of an imaging result of the target irradiated with the visible light and acquires optical absorption property data in which an optical absorption region on the surface of the target is visualized as the two-dimensional data on a basis of an imaging result of the target irradiated with the invisible light, wherein the controller corrects the three-dimensional data based on a generator and a discriminator such that a difference discriminated by the discriminator becomes smaller, and generates the target digital twin model by associating the corrected three-dimensional data with the two-dimensional data, the generator generating a first appearance image indicating appearance of the target at a certain viewpoint from a model generated by pasting the texture data to the three-dimensional data, the discriminator discriminating the difference between the first appearance image generated by the generator and a second appearance image which is generated from the imaging result of the target irradiated with the visible light and which indicates appearance of the target at a same viewpoint as a viewpoint of the first appearance image, wherein the controller recognizes additional information added to the surface of the target as characters or figures on a basis of the two-dimensional appearance of the target acquired from the target digital twin model and generates target master data as a comprehensive database regarding the target in which the additional information is registered along with the three-dimensional data and the two-dimensional data, wherein the controller acquires a product code and product information associated with the target on a basis of the additional information and further registers the acquired product code and product information in the target master data, and wherein the controller learns handling information for implementing optimal handling of the target including an optimal gripping position of the target by performing a simulation of handling of the target by a robot and further registers the learned handling information in the target master data.

2. A robot control system comprising:

a sensor that detects information regarding appearance of a handling target of a robot; and a robot controller that controls the robot so as to perform handling of the handling target on a basis of a detection result of the information regarding the appearance of the handling target and handling information of target master data acquired from a target digital twin model generation system, the target digital twin model generation system comprising:

a light output configured to output planar light having a predetermined pattern and light, which includes visible light and invisible light to a target, having a plurality of wavelengths, from a plurality of illumination positions that surround the target at different timings;

an imager configured to individually capture images of the target irradiated with the planar light and the target sequentially irradiated with the light having the plurality of wavelengths, at a plurality of imaging positions corresponding to the plurality of illumination positions in synchronization with timings at which the planar light and the light having the plurality of wavelengths are respectively output; and a controller configured to control the light output and the imager, wherein the controller acquires three-dimensional data indicating a three-dimensional shape over an entire circumference of a surface of the target on a basis of an imaging result of the target irradiated with the planar light, acquires two-dimensional data indicating a two-dimensional appearance over the entire circumference of the target viewed from the plurality of imaging positions on a basis of imaging results of the target sequentially irradiated with the light having the plurality of wavelengths, and generates a target digital twin model that reproduces appearance of the target in a computer-readable form by associating the three-dimensional data with the two-dimensional data, wherein the controller acquires texture data indicating texture of the surface of the target as the two-dimensional data on a basis of an imaging result of the target irradiated with the visible light and acquires optical absorption property data in which an optical absorption region on the surface of the target is visualized as the two-dimensional data on a basis of an imaging result of the target irradiated with the invisible light, wherein the controller corrects the three-dimensional data based on a generator and a discriminator such that a difference discriminated by the discriminator becomes smaller, and generates the target digital twin model by associating the corrected three-dimensional data with the two-dimensional data, the generator generating a first appearance image indicating appearance of the target at a certain viewpoint from a model generated by pasting the texture data to the three-dimensional data, the discriminator discriminating the difference between the first appearance image generated by the generator and a second appearance image which is generated from the imaging result of the target irradiated with the visible light and which indicates appearance of the target at a same viewpoint as a viewpoint of the first appearance image, wherein the controller recognizes additional information added to the surface of the target as characters or figures on a basis of the two-dimensional appearance of the target acquired from the target digital twin model and generates target master data as a comprehensive database regarding the target in which the additional information is registered along with the three-dimensional data and the two-dimensional data, wherein the controller acquires a product code and product information associated with the target on a basis of the additional information and further registers the acquired product code and product information in the target master data, wherein the controller learns handling information for implementing optimal handling of the target including an optimal gripping position of the target by performing a simulation of handling of the target by a robot and further registers the learned handling information in the target master data.

3. The robot control system according to claim 2, wherein the robot controller acquires a product code added to the handling target from the detection result of the information regarding the appearance of the handling target and, in a case where the acquired product code is different from the product code registered in the target master data, controls the robot so as to perform handling of another handling target.

4. The robot control system according to claim 3, wherein in a case where the product code acquired from the detection result of the information regarding the appearance of the handling target matches the product code registered in the target master data, the robot controller acquires product information added to a surface of the handling target from the detection result of the information regarding the appearance of the handling target and, in a case where the acquired product information is different from the product information registered in the target master data, updates the target master data on a basis of the acquired product information.

5. A virtual shop generation system comprising:

an acquirer configured to acquire target master data from a target digital twin model generation system; and a virtual shop generator configured to generate a virtual shop that virtually reproduces a store in which products associated with product codes and product information registered in the target master data acquired by the acquirer are arbitrarily displayed, wherein the target digital twin model generation system comprises:

a light output configured to output planar light having a predetermined pattern and light, which includes visible light and invisible light to a target, having a plurality of wavelengths, from a plurality of illumination positions that surround the target at different timings;

an imager configured to individually capture images of the target irradiated with the planar light and the target sequentially irradiated with the light having the plurality of wavelengths, at a plurality of imaging positions corresponding to the plurality of illumination positions in synchronization with timings at which the planar light and the light having the plurality of wavelengths are respectively output; and a controller configured to control the light output and the imager, wherein the controller acquires three-dimensional data indicating a three-dimensional shape over an entire circumference of a surface of the target on a basis of an imaging result of the target irradiated with the planar light, acquires two-dimensional data indicating a two-dimensional appearance over the entire circumference of the target viewed from the plurality of imaging positions on a basis of imaging results of the target sequentially irradiated with the light having the plurality of wavelengths, and generates a target digital twin model that reproduces appearance of the target in a computer-readable form by associating the three-dimensional data with the two-dimensional data, wherein the controller acquires texture data indicating texture of the surface of the target as the two-dimensional data on a basis of an imaging result of the target irradiated with the visible light and acquires optical absorption property data in which an optical absorption region on the surface of the target is visualized as the two-dimensional data on a basis of an imaging result of the target irradiated with the invisible light, wherein the controller corrects the three-dimensional data based on a generator and a discriminator such that a difference discriminated by the discriminator becomes smaller, and generates the target digital twin model by associating the corrected three-dimensional data with the two-dimensional data, the generator generating a first appearance image indicating appearance of the target at a certain viewpoint from a model generated by pasting the texture data to the three-dimensional data, the discriminator discriminating the difference between the first appearance image generated by the generator and a second appearance image which is generated from the imaging result of the target irradiated with the visible light and which indicates appearance of the target at a same viewpoint as a viewpoint of the first appearance image, wherein the controller recognizes additional information added to the surface of the target as characters or figures on a basis of the two-dimensional appearance of the target acquired from the target digital twin model and generates target master data as a comprehensive database regarding the target in which the additional information is registered along with the three-dimensional data and the two-dimensional data, wherein the controller acquires a product code and product information associated with the target on a basis of the additional information and further registers the acquired product code and product information in the target master data, and wherein the controller learns handling information for implementing optimal handling of the target including an optimal gripping position of the target by performing a simulation of handling of the target by a robot and further registers the learned handling information in the target master data.

* * * * *